(12) United States Patent
Maeda et al.

(10) Patent No.: US 11,911,933 B2
(45) Date of Patent: Feb. 27, 2024

(54) MOLDED BODY AND MANUFACTURING METHOD THEREFOR

(71) Applicant: Mitsubishi Chemical Corporation, Chiyoda-ku (JP)

(72) Inventors: Akihiro Maeda, Tokyo (JP); Masao Tomioka, Tokyo (JP)

(73) Assignee: Mitsubishi Chemical Corporation, Chiyoda-ku (JP)

(*) Notice: Subject to any disclaimer, the term of this patent is extended or adjusted under 35 U.S.C. 154(b) by 599 days.

(21) Appl. No.: 15/562,185

(22) PCT Filed: Mar. 30, 2016

(86) PCT No.: PCT/JP2016/060454
§ 371 (c)(1),
(2) Date: Sep. 27, 2017

(87) PCT Pub. No.: WO2016/159118
PCT Pub. Date: Oct. 6, 2016

(65) Prior Publication Data
US 2018/0104869 A1    Apr. 19, 2018

(30) Foreign Application Priority Data

Mar. 30, 2015  (JP) ................. 2015-067850

(51) Int. Cl.
*B29C 37/00* (2006.01)
*B29C 43/18* (2006.01)
(Continued)

(52) U.S. Cl.
CPC .......... *B29C 43/18* (2013.01); *B29C 37/0053* (2013.01); *B29C 70/06* (2013.01);
(Continued)

(58) Field of Classification Search
CPC .... B29C 43/18; B29C 37/0053; B29C 70/083
See application file for complete search history.

(56) References Cited

U.S. PATENT DOCUMENTS 7,479,201 B1    1/2009  Wegner et al.
7,871,487 B1    1/2011  Wegner et al.
(Continued)

FOREIGN PATENT DOCUMENTS

DE    102012111488 A1 *  5/2014  ........... B29C 43/021
JP    08216151 A   *  8/1996
(Continued)

OTHER PUBLICATIONS

International Search Report dated May 24, 2016, in PCT/JP2016/060454 filed Mar. 30, 2016.
(Continued)

*Primary Examiner* — Laura A Auer
(74) *Attorney, Agent, or Firm* — Oblon, McClelland, Maier & Neustadt, L.L.P.

(57) ABSTRACT

A molding provided with a sheet-shaped composite material section formed from a fiber-reinforced composite material containing reinforcing fibers and a matrix resin, and protruding ribs formed directly on a first surface of the composite material section and containing a thermoplastic resin, wherein the ribs intersect with each other on the first surface, and the mean width t, mean height H and the proportion occupied on the first surface are within specified ranges. A manufacturing method for the molding including a composite material section-forming step for forming the composite material section, and a rib-forming step for forming the ribs so as to satisfy the above conditions.

12 Claims, 10 Drawing Sheets

(51) Int. Cl.
*B29C 70/06* (2006.01)
*B29C 70/08* (2006.01)
*B29C 70/14* (2006.01)
*B29C 70/54* (2006.01)

(52) U.S. Cl.
CPC ............ *B29C 70/083* (2013.01); *B29C 70/14* (2013.01); *B29C 70/541* (2013.01)

(56) References Cited

U.S. PATENT DOCUMENTS

| | | |
|---|---|---|
| 8,236,124 B1 | 8/2012 | Wegner et al. |
| 8,435,375 B1 | 5/2013 | Wegner et al. |
| 2011/0143110 A1 | 6/2011 | Tsuchiya et al. |
| 2013/0234361 A1* | 9/2013 | Tsuchiya .................. C08J 5/042 264/257 |
| 2015/0151506 A1* | 6/2015 | Hawley .................. B32B 5/028 428/141 |
| 2015/0183183 A1* | 7/2015 | Takano ..................... B32B 3/30 428/178 |
| 2015/0298368 A1* | 10/2015 | Krahnert ............... B29C 43/222 264/154 |
| 2017/0106606 A1* | 4/2017 | Toyozumi ................. B23C 3/00 |

FOREIGN PATENT DOCUMENTS

| | | | |
|---|---|---|---|
| JP | 9-155862 A | 6/1997 | |
| JP | 2010-253802 A | 11/2010 | |
| JP | 2013-176984 A | 9/2013 | |
| JP | 2013176984 A * | 9/2013 | |
| WO | WO 2010/013645 A1 | 2/2010 | |
| WO | WO-2014014051 A1 * | 1/2014 | |
| WO | WO-2015013529 A1 * | 1/2015 | ......... B29C 45/0005 |

OTHER PUBLICATIONS

Extended European Search Report dated Mar. 1, 2018 in European Patent Application No. 16772999.5, 7 pages
Office Action dated Sep. 29, 2019 in Chinese Patent Application No. 201680019466. 3 (with unedited computer generated English translation), 13 pages.
Office Action dated Mar. 13, 2020 in Chinese Application No. 201680019466.3 with English translation, 16 pages.
Office Action dated Mar. 29, 2019 in European Patent Application No. 16772999.5.
Combined Office Action and Search Report dated Jan. 22, 2019 in Chinese Patent Application No. 201680019466.3 (with unedited computer generated English translation and English translation of categories of cited references).

* cited by examiner

MOLDED BODY AND MANUFACTURING METHOD THEREFOR

TECHNICAL FIELD

The present invention relates to a molded body and a method for manufacturing the same.

This application is based upon and claims the benefit of priority from the prior Japanese Patent Application No. 2015-067850, filed on Mar. 30, 2015, the content of which is incorporated herein by reference.

BACKGROUND ART

A molded body formed by shaping a fiber reinforced composite material containing a reinforced fiber and a thermoplastic resin into a three-dimensional (3D) complex shape using stamping molding has been widely used in various fields such as an aircraft member, an automobile member, a windmill member for wind power generation, sports equipment, etc. A fiber reinforced composite material containing a reinforced fiber having a fiber length of several mm to several tens mm and a thermoplastic resin is frequently used when a molded body having a complicated shape including a curved portion and a bent portion is manufactured using stamping molding.

For example, Patent Literature 1 describes that a sheet in which a thermoplastic resin is impregnated into a reinforced fiber is cut to have a length of about several tens mm and allowed to naturally fall, a deposit thereof is heated and pressed to obtain a sheet-shaped fiber reinforced composite material, and then the fiber reinforced composite material is used for stamping molding. Patent Literature 2 describes that a fiber reinforced composite material is obtained by stacking a plurality of prepregs in which a thermoplastic resin is impregnated into a carbon fiber base material obtained by performing papermaking on a carbon fiber having a fiber length of several mm to several tens mm, and the fiber reinforced composite material is subjected to stamping molding to obtain a molded body having a complicated shape such as a box shape.

However, when the molded body is manufactured by shaping the fiber reinforced composite material using stamping molding, warping may occur in the molded body due to a force applied to the molded body at the time of demolding from a mold for stamping molding. In particular, warping easily occurs in the molded body when three-dimensionally complicated shaped molded body is manufactured using a fiber reinforced composite material containing a reinforce fiber having a fiber length of several mm to several tens of mm.

Incidentally, Patent Literature 3 describes a molded body in which a thermoplastic resin is injection-molded on one surface of a fiber reinforced composite material plate to form a rib portion in a lattice shape. In manufacture of the molded body, a plurality of prepregs impregnated with a matrix resin in a carbon fiber aligned in one direction is stacked to form a fiber reinforced composite material. Then, the fiber reinforced composite material is heated and pressed to form a fiber reinforced composite material plate. Thereafter, the fiber reinforced composite material plate is disposed in a mold for injection molding, and a thermoplastic resin is injection-molded on one surface thereof to form a lattice-shaped rib portion. In the molded body of Patent Literature 3, occurrence of warping resulting from a difference in thermal expansion coefficient between the fiber reinforced composite material plate and the thermoplastic resin is suppressed by forming the lattice-shaped rib portion on the one surface of the fiber reinforced composite material plate.

However, Patent Literature 3 does not consider stamping molding. Further, when the above-described technology of Patent Literature 3 is applied to stamping molding without change, the problem of warping occurring in the molded body at the time of demolding from the mold for stamping molding is not solved. Furthermore, the technology is disadvantageous in terms of cost when the amount of formation of the rib portion is large.

In addition, normally, after the fiber reinforced composite material is molded at a high temperature (for example, about 200° C.), the molded body is cooled up to about room temperature. For this reason, warping easily occurs due to a temperature difference, and it is important to sufficiently suppress occurrence of warping.

CITATION LIST

Patent Literature

Patent Literature 1: JP 9-155862 A
Patent Literature 2: WO 2010/013645 A
Patent Literature 3: JP 2010-253802 A

SUMMARY OF THE INVENTION

Problem to be Solved by the Invention

An object of the invention is to provide a molded body in which occurrence of warping is suppressed at the time of manufacture such as demolding from a mold while suppressing an excessive increase in mass of the molded body, and a method for manufacturing the molded body.

Means for Solving Problem

The invention has the following configurations.

[1] A method for manufacturing a molded body including a plate-shaped composite member made of a fiber reinforced composite material and rib portions corresponding to two or more convex stripes which are directly formed on a surface of the composite member and contain a thermoplastic resin (B) by supplying and molding the thermoplastic resin (B) in a molten state in a mold in a state in which the fiber reinforced composite material containing a reinforced fiber (f1) and a matrix resin (A) is disposed, the method including a composite member formation process of forming the composite member by shaping the fiber reinforced composite material using the mold and a rib portion formation process of forming the two or more rib portions to satisfy conditions (1) to (5) below by supplying the thermoplastic resin (B) in the molten state into the mold:

(1) An arbitrary rib portion or an extended line of a long axis thereof intersects with another rib portion or an extended line of a long axis thereof on a surface of the composite member.
(2) A ratio H/t of an average height H to an average width t of the rib portions is 1 or more and 50 or less.
(3) A ratio $S_R/S$ of an area $S_R$ occupied by the rib portions on a surface of the composite member on a side at which the rib portions are formed to an area S of the surface is $5.0 \times 10^{-3}$ or more and less than $8.0 \times 10^{-2}$.
(4) A ratio $H/T_I$ of the average height H of the rib portions to an average thickness $T_I$ of the composite member is 2.5 or more and 13 or less.

(5) A ratio Q of a length of at least one rib portion to a circumferential length of an outer edge of the composite member is 8% or more.

[2] The method according to item [1], wherein the rib portion formation process is performed after the composite member formation process is performed.

[3] The method according to item [1], wherein the composite member formation process and the rib portion formation process are simultaneously performed.

[4] A molded body including a plate-shaped composite member made of a fiber reinforced composite material containing a reinforced fiber (f1) and a matrix resin (A), and rib portions corresponding to two or more convex stripes which are directly formed on a surface of the composite member and contain a thermoplastic resin (B), wherein the molded body satisfies the following conditions (1') to (5'):

(1') An arbitrary rib portion or an extended line of a long axis thereof intersects with another rib portion or an extended line of a long axis thereof on the surface of the composite member.

(2') A ratio H/t of an average height H to an average width t of the rib portions is 1 or more and 50 or less.

(3') A ratio $S_R/S$ of an area $S_R$ occupied by the rib portions on a surface of the composite member on a side at which the rib portions are formed to an area S of the surface is $5.0 \times 10^{-3}$ or more and less than $8.0 \times 10^{-2}$ (4') A ratio $H/T_f$ of the average height H of the rib portions to an average thickness $T_f$ of the composite member is 2.5 or more and 13 or less.

(5') A ratio Q of a length of at least one rib portion to a circumferential length of an outer edge of the composite member is 8% or more.

[5] The molded body according to item [4], wherein a number average fiber length of the reinforced fiber (f1) is in a range of 1 to 100 mm.

[6] The molded body according to item [4] or [5], wherein the composite member is bent or curved.

[7] The molded body according to any one of items [4] to [6], wherein the rib portions are formed using only the thermoplastic resin (B).

[8] The molded body according to any one of items [4] to [6], wherein the rib portions are formed using the thermoplastic resin (B) and a reinforced fiber (f2) having a number average fiber length less than 1 mm.

[9] The molded body according to item [8], wherein a fiber mass fraction of the reinforced fiber (f2) in the rib portions is 40% by mass or less.

[10] The molded body according to any one of items [4] to [6], wherein the reinforced fiber (f1) having a number average fiber length of 1 to 100 mm is contained in root side portions of the rib portions, and distal end portions of the rib portions are formed using only the thermoplastic resin (B).

[11] The molded body according to any one of items [4] to [6], wherein the reinforced fiber (f1) having a number average fiber length of 1 to 100 mm is contained in root side portions of the rib portions, and distal end portions of the rib portions are formed using the thermoplastic resin (B) and a reinforced fiber (f2) having a number average fiber length less than 1 mm.

[12] The molded body according to item [11], wherein a fiber mass fraction of the reinforced fiber (f2) in the distal end portions of the rib portions is 30% by mass or less.

Effect of the Invention

In a molded body of the invention, occurrence of warping is suppressed at the time of manufacture such as demolding from a mold while suppressing an excessive increase in mass of the molded body.

According to a method for manufacturing a molded body of the invention, it is possible to suppress occurrence of warping in the molded body at the time of manufacture such as demolding from a mold while suppressing an excessive increase in mass of the molded body.

MODE(S) FOR CARRYING OUT THE INVENTION

In the invention, a statement "a fiber reinforced composite material is shaped" means that a fiber reinforced composite material is deformed and molded into a desired shape, and includes a mode in which a lump, etc. of a fiber reinforced composite material is molded into a plate shape in addition to a mode in which a sheet-shaped fiber reinforced composite material is molded into a complicated shape such as a 3D shape.

[Molded Body]

A molded body of the invention includes a plate-shaped composite member made of a fiber reinforced composite material containing a reinforced fiber (f1) and a matrix resin (A), and rib portions corresponding to two or more protruding stripe which are directly formed on a surface of the composite member and contain a thermoplastic resin (B). For example, the molded body of the invention is obtained by supplying the thermoplastic resin (B) in a molten state while the fiber reinforced composite material is disposed in a mold to shape the fiber reinforced composite material and mold the thermoplastic resin (B). That is, for example, the molded body of the invention is obtained by integrally molding the composite member and the rib portions in the same mold.

In the molded body of the invention, the rib portions are formed to satisfy conditions (1') to (5') below. When the rib portions are formed on the surface of the composite member to satisfy these conditions, warping is inhibited form occurring on the composite member due to a force applied to the molded body at the time of demolding from the mold or a temperature difference.

(1') An arbitrary rib portion or an extended line of a long axis thereof intersects with another rib portion or an extended line of a long axis thereof on the surface of the composite member.

(2') A ratio H/t of an average height H to an average width t of the rib portions is 1 or more and 50 or less.

(3') A ratio $S_R/S$ of an area $S_R$ occupied by the rib portions on a surface of the composite member on a side at which the rib portions are formed to an area S of the surface is $5.0 \times 10^{-3}$ or more and less than $8.0 \times 10^{-2}$ (4') A ratio $H/T_f$ of the average height H of the rib portions to an average thickness $T_f$ of the composite member is 2.5 or more and 13 or less.

(5') A ratio Q of a length of at least one rib portion to a circumferential length of an outer edge of the composite member is 8% or more.

Hereinafter, a description will be given of conditions (1') to (5') using molded bodies 11 to 16 illustrated in FIG. 1A, FIG. 1B, and FIGS. 2 to 6 as examples. The same reference symbol will be assigned to the same portion in FIG. 1A, FIG. 1B, and FIGS. 2 to 6, and a description will be omitted.

Figure 1A:
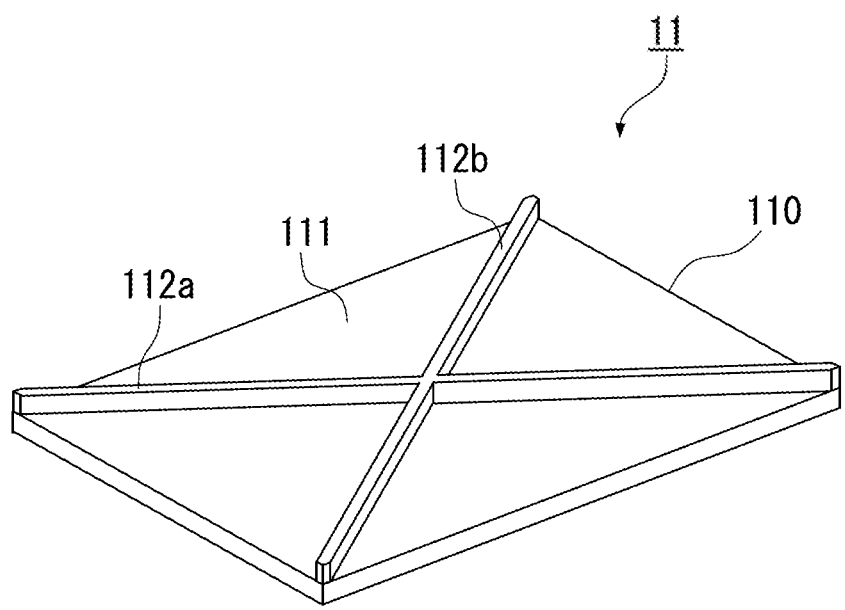
FIG. 1A is a perspective view illustrating an example of a molded body of the invention.
Figure 1B:
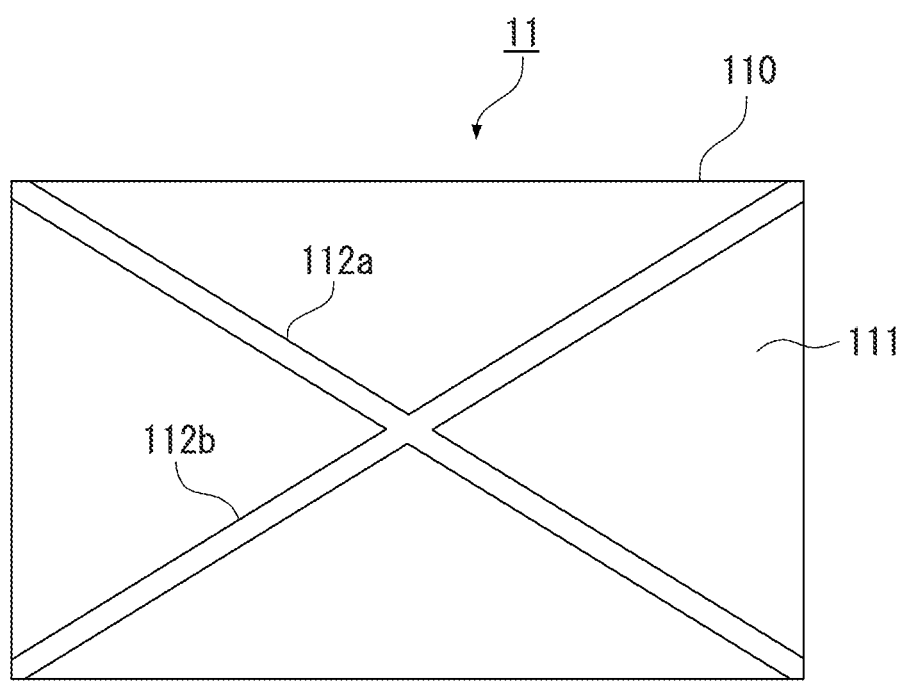
FIG. 1B is a plan view illustrating the example of the molded body of the invention.

As illustrated in FIG. 1A and FIG. 1B, the molded body 11 includes a plate-shaped composite member 110 having a rectangular shape in a plan view, and a first rib portion 112a and a second rib portion 112b corresponding to two protruding stripes directly formed on a first surface 111 of the composite member 110 in a thickness direction. The first rib portion 12a and the second rib portion 112b are made of a plate piece having a rectangular cross section. Each of the first rib portion 112a and the second rib portion 112b is formed on a diagonal line of the composite member 110.

Figure 2:
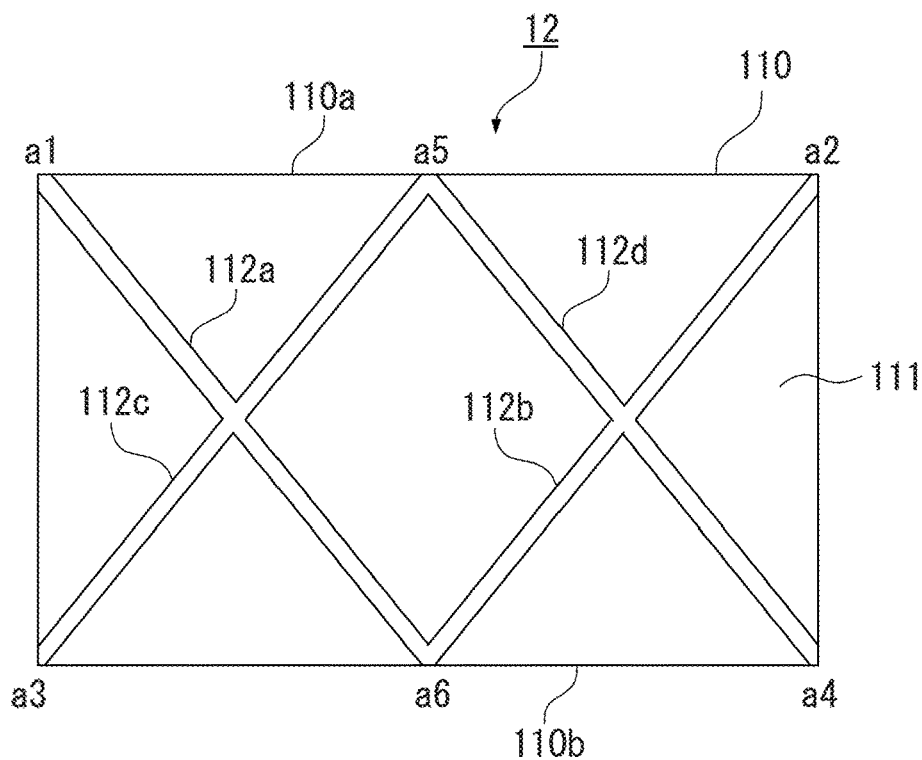
FIG. 2 is a plan view illustrating another example of the molded body of the invention.

As illustrated in FIG. 2, the molded body 12 includes a composite member 110 and a first rib portion 112a to a fourth rib portion 112d corresponding to four protruding stripes directly formed on a first surface 111 of the composite member 110. The first rib portion 112a to the fourth rib portion 112d are made of a plate piece having a rectangular cross section. The first rib portion 112a and the second rib portion 112b are formed in a V shape on a line connecting a midpoint a6 of a second long side 110b of the composite member 110 to each of both ends a1 and a2 of a first long side 110a. The third rib portion 112c and the fourth rib portion 112d are formed in an inverted V shape on a line connecting a midpoint a5 of the first long side 110a to each of both ends a3 and a4 of the second long side 110b.

Figure 3:
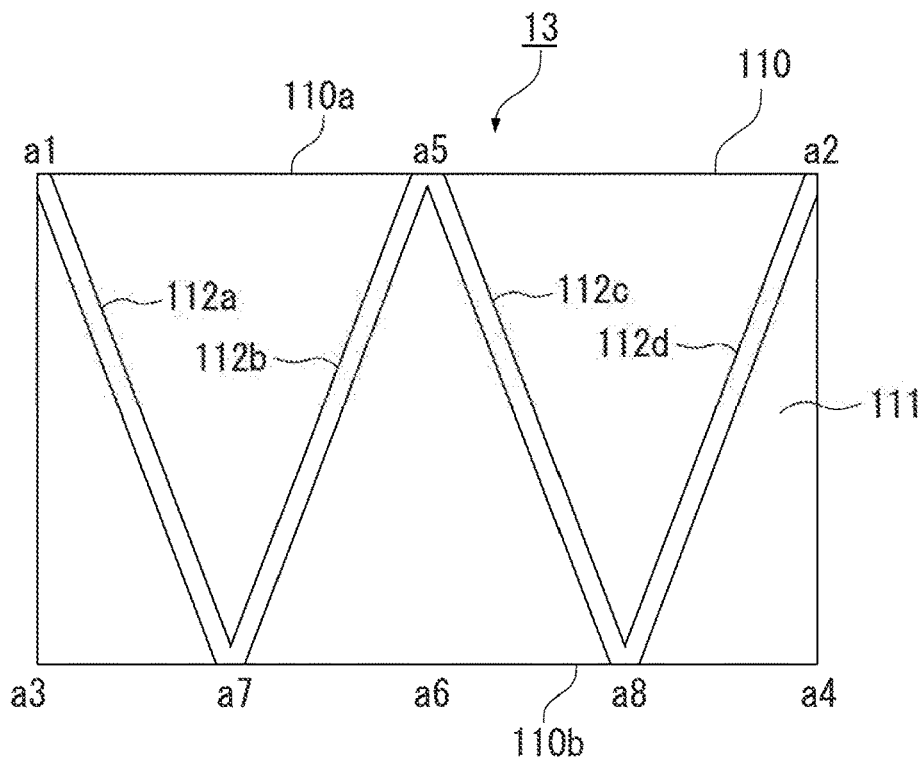
FIG. 3 is a plan view illustrating another example of the molded body of the invention.

As illustrated in FIG. 3, the molded body 13 includes a composite member 110 and a first rib portion 112a to a fourth rib portion 112d corresponding to four protruding stripes directly formed on a first surface 111 of the composite member 110. The first rib portion 112a to the fourth rib portion 112d are made of a plate piece having a rectangular cross section. The first rib portion 112a and the second rib portion 112b are formed in a V shape on a line connecting a point a7, which bisects a segment between a left end a3 and a midpoint a6 of a second long side 110b of the composite member 110, to each of a left end a1 and a midpoint a5 of a first long side 110a. The third rib portion 112c and the fourth rib portion 112d are formed in a V shape on a line connecting a point a8, which bisects a segment between the midpoint a6 and a right end a4 of the second long side 110b, to each of the midpoint a5 and a right end a2 of the first long side 110a.

Figure 4:
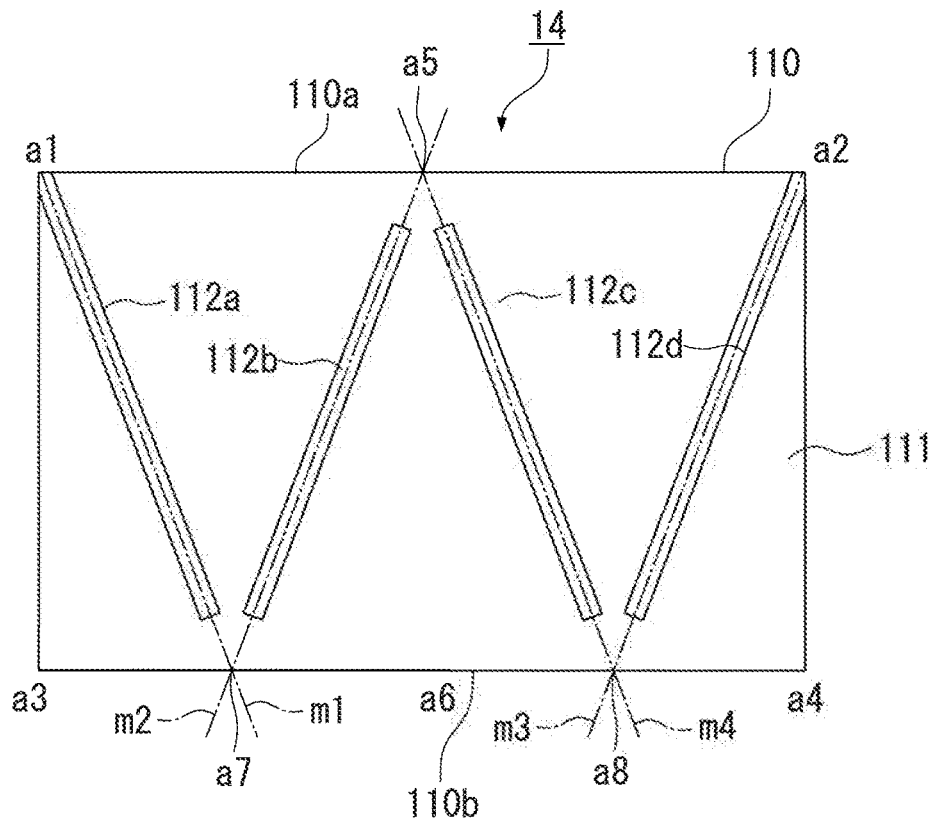
FIG. 4 is a plan view illustrating another example of the molded body of the invention.

As illustrated in FIG. 4, the molded body 14 includes a composite member 110 and a first rib portion 112a to a fourth rib portion 112d corresponding to four protruding stripes directly formed on a first surface 111 of the composite member 110. The first rib portion 112a to the fourth rib portion 112d are made of a plate piece having a rectangular cross section. The molded body 14 is the same as the molded body 13 except that a portion of the first rib portion 112a on the point a7 side, both end portions of the second rib portion 112b, both end portions of the third rib portion 112c, and a portion of the fourth rib portion 112d on the point a8 side in the molded body 13 are partially removed.

Figure 5:
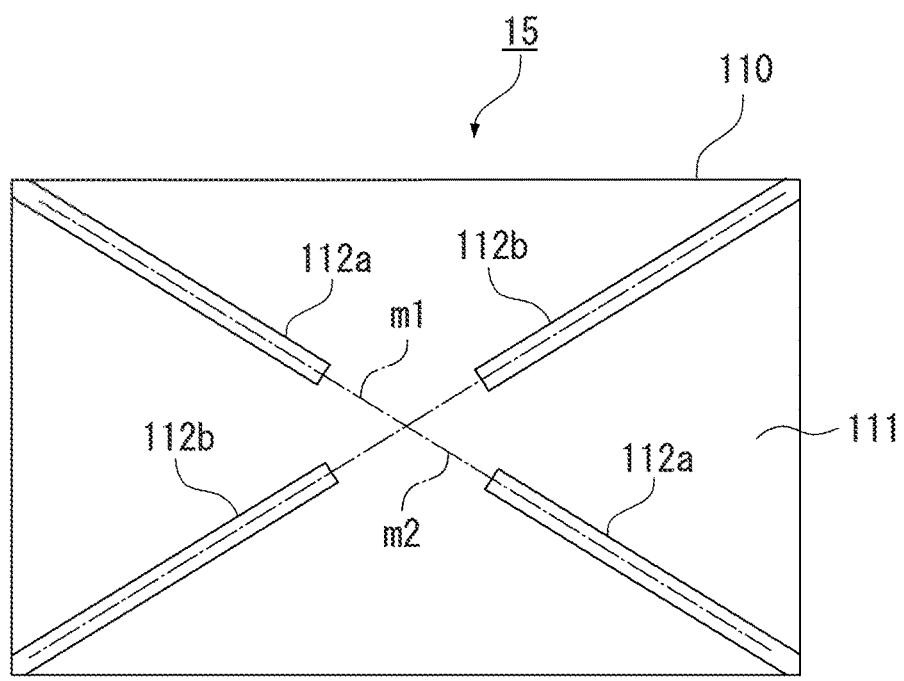
FIG. 5 is a plan view illustrating another example of the molded body of the invention.

As illustrated in FIG. 5, the molded body 15 includes a composite member 110 and first rib portions 112a and 112a corresponding to two protruding stripes and second rib portions 112b and 112b corresponding to two protruding stripes directly formed on a first surface 111 of the composite member 110. The first rib portions 112a and 112a and the second rib portions 112b and 112b are made of a plate piece having a rectangular cross section. The molded body 15 is the same as the molded body 11 except that an intersecting portion of the first rib portion 112a and the second rib portion 112b in the molded body 11 is removed and each of the rib portions is divided.

Figure 6:
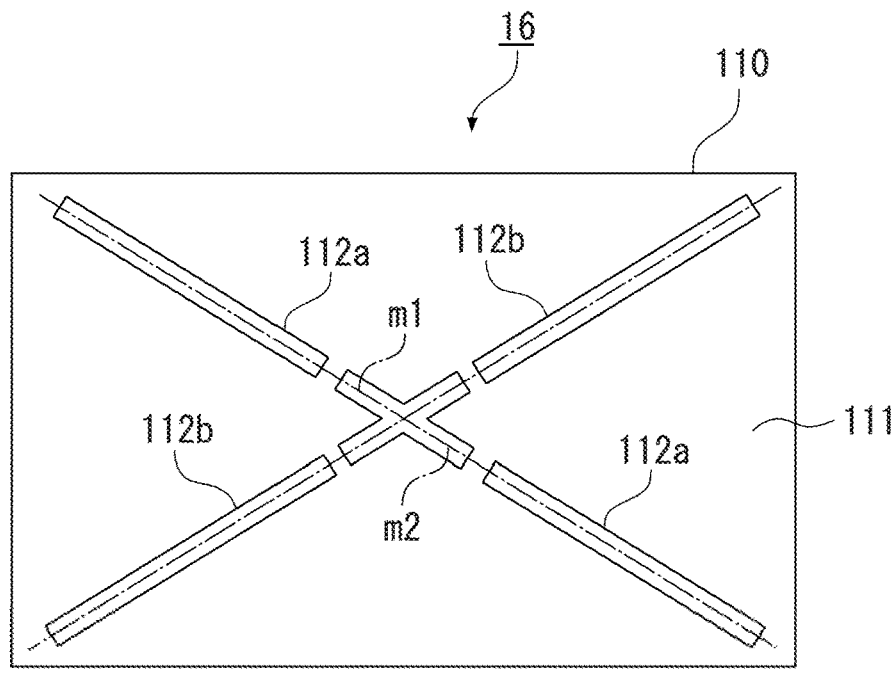
FIG. 6 is a plan view illustrating another example of the molded body of the invention.

As illustrated in FIG. 6, the molded body 16 includes a composite member 110 and first rib portions 112a and 112a corresponding to two protruding stripes and second rib portions 112b and 112b corresponding to two protruding stripes directly formed on a first surface 11 of the composite member 110. The molded body 16 is the same as the molded body 11 except that portions around an intersection point of the first rib portion 112a and the second rib portion 12b and portions of 14.6 mm from both ends thereof in the molded body 11 are partially removed and each of the rib portions is divided.

In the invention, a cross-sectional shape perpendicular to a lengthwise direction of the rib portions is not limited to the rectangular shape. For example, a trapezoidal shape, etc. may be employed.

(Condition (1'))

In the molded body of the invention, an arbitrary rib portion or an extended line of a long axis thereof intersects with another rib portion or an extended line of a long axis thereof on the surface of the composite member. In the invention, the statement "intersects on the surface of the composite member" includes a mode of intersecting at an outer edge on the surface of the composite member. The "long axis of the rib portion" refers to an axis passing through a center of the rib portion in a width direction in a plan view.

In the molded body 11, the first rib portion 112a and the second rib portion 112b formed on the diagonal lines of the composite member 110 intersect each other on the first surface 111 of the composite member 110.

In the molded body 12, the first rib portion 112a and the second rib portion 112b intersect each other at an outer edge of the first surface 111 (the point a6 on the second long side 110b) in the composite member 110. The third rib portion 112c and the fourth rib portion 112d intersect each other at an outer edge of the first surface 111 (the point a5 on the first long side 110a) in the composite member 110. Further, the first rib portion 112a intersects with the third rib portion 112c, and the second rib portion 112b intersects with the fourth rib portion 112d on the first surface 111 of the composite member 110.

In the molded body 13, the first rib portion 112a and the second rib portion 112b intersect each other, and the third rib portion 112c and the fourth rib portion 112d intersect each other at an outer edge of the first surface 111 (the point a7 and the point a8 on the second long side 110b) in the composite member 110. The second rib portion 112b and the third rib portion 112c intersect each other at an outer edge of the first surface 111 (the point a5 on the second long side 110a) in the composite member 110.

In the molded body 14, an extended line m1 of a long axis of the first rib portion 112a intersects with an extended line m2 of a long axis of the second rib portion 112b at an outer edge of the first surface 111 (the point a7 on the second long side 110b) in the composite member 110. In addition, the extended line m2 of the long axis of the second rib portion 112b intersects with an extended line m3 of a long axis of the third rib portion 112c at an outer edge of the first surface 111 (the point a5 on the first long side 110a) in the composite member 110. Further, the extended line m3 of the long axis of the third rib portion 112c intersects with an extended line m4 of a long axis of the fourth rib portion 112d at an outer edge of the first surface 111 (the point as on the second long side 10b) in the composite member 110.

In the molded body 15 and the molded body 16, an extended line m1 of a long axis of the first rib portion 112a intersects with an extended line m2 of a long axis of the second rib portion 112b on the first surface 11 of the composite member 110.

In the molded bodies 11 to 15, the rib portion intersects with the rib portion, or the extended line of the long axis of the rib portion interests with the extended line of the long axis of the rib portion on the surface of the composite member. However, in the invention, the extended line of the long axis of the rib portion may interest with the rib portion on the surface of the composite member.

An intersection angle between an arbitrary rib portion or an extended line of a long axis thereof and another rib portion or an extended line of a long axis thereof on the surface of the composite member is preferably in a range of 30 to 900, more preferably in a range of 45 to 90°. The intersection angle refers to a smaller angle in angles formed when the arbitrary rib portion or the extended line of the long axis thereof intersects with another rib portion or the extended line of the long axis thereof.

(Condition (2'))

In the molded body of the invention, a ratio H/t of an average height H to an average width t of the rib portions is 1 or more and 50 or less. When the ratio H/t is 1 or more, a sufficient warp suppressing effect is obtained. When the ratio H/t is 50 or less, strength of the rib portion is sufficiently high, so that the warp suppressing effect is sufficiently exhibited. The ratio H/t is preferably 5 or more and 20 or less.

The "width of the rib portion" refers to a width at a base end of the rib portion. In addition, the "average width t of the rib portion" refers to an average value of widths measured at ten arbitrary positions in the rib portion. The "average height H of the rib portion" refers to an average value of heights measured at ten arbitrary positions in the rib portion.

(Condition (3'))

In the molded body of the invention, a ratio SA/S of an area $S_R$ occupied by the rib portions on a surface of the composite member on a side at which the rib portions are formed to an area S of the surface is $5.0 \times 10^{-3}$ or more and less than $8.0 \times 10^{-2}$. For example, in the molded body 11, a ratio $S_R/S$ of an area $S_R$ occupied by the first rib portion 112a and the second rib portion 112b on the first surface 11 of the composite member 110 to the area S of the first surface 111 is $5.0 \times 10^{-3}$ or more and less than $8.0 \times 10^{-2}$. When the ratio $S_R/S$ is $5 \times 10^3$ or more, a sufficient warp suppressing effect is obtained. When the ratio Sa/S is less than $8.0 \times 10^{-2}$, an excessive increase in mass of the molded body may be suppressed, lightness is easily ensured, and a rise in cost may be suppressed. The ratio $S_R/S$ is preferably $5.0 \times 10^{-3}$ or more and less than $5.0 \times 10^{-2}$, and more preferably $1.0 \times 10^{-2}$ or more and less than $3.0 \times 10^{-2}$.

(Condition (4'))

In the molded body of the invention, a ratio $H/T_I$ of the average height H of the rib portions to an average thickness $T_I$ of the composite member is 2.5 or more and 13 or less. When the ratio $H/T_I$ is 2.5 or more, a sufficient warp suppressing effect is obtained. When the ratio $H/T_I$ is 13 or less, an excessive increase in mass of the molded body may be suppressed, lightness is easily ensured, and a rise in cost may be suppressed. The ratio $H/T_I$ is preferably 3 or more and 13 or less, and more preferably 3 or more and 6 or less. The "average thickness T of the composite member" refers to an average value of thicknesses measured at ten arbitrary positions in the composite member.

(Condition (5'))

In the molded body of the invention, a ratio Q of a length of at least one rib portion to a circumferential length of an outer edge of the composite member is 8% or more. When the ratio Q is 8% or more, a sufficient warp suppressing effect is obtained. The ratio Q is preferably in a range of 8 to 50%, and more preferably in a range of 20 to 40%. When the ratio Q is less than or equal to the upper limit, an excessive increase in mass of the molded body may be suppressed, lightness is easily ensured, and a rise in cost may be suppressed.

In the molded body of the invention, only some of the two or more rib portions may satisfy condition (5'), and all the rib portions may satisfy condition (5'). In the molded body of the invention, it is preferable that all the rib portions satisfy condition (5') in terms of easily obtaining a sufficient warp suppressing effect.

The number of rib portions formed in the composite member is not particularly restricted, and may be appropriately determined in a range satisfying conditions (1') to (5').

In the molded body of the invention, rib portions simultaneously satisfying conditions (1') to (5') need to be formed. The molded body of the invention may further include a rib portion that does not intersect with another rib portion or an extended line of a long axis thereof on the surface of the composite member within a range in which the effect of the invention is not impaired. In addition, the molded body of the invention may further include a rib portion whose ratio H/t is less than 5 or more than 20 within the range in which the effect of the invention is not impaired. In addition, the molded body of the invention may further include a rib portion whose ratio $H/T_I$ is less than 3 or more than 13 within the range in which the effect of the invention is not impaired.

(Fiber Reinforced Composite Material)

The fiber reinforced composite material that forms the composite member contains the reinforced fiber (f1) and the matrix resin (A).

Examples of the fiber reinforced composite material include a prepreg in which the reinforcing fiber (f1) is impregnated with the matrix resin (A), a prepreg stacked body obtained by stacking a plurality of the prepregs, a mat in which the matrix resin (A) is impregnated in a nonwoven fabric including discontinuous reinforced fibers (f1), an extruded sheet obtained by kneading reinforcing fibers in a resin in an extruder to form a sheet, etc. A material obtained by notching or cutting a prepreg in which reinforced fibers (f1) aligned in one direction is impregnated with the matrix resin (A) to cut the reinforced fibers (f1) in the prepreg short may be used as the fiber reinforced composite material.

The reinforced fiber (f1) is not particularly limited. For example, it is possible to use an inorganic fiber, an organic fiber, a metal fiber, or a reinforced fiber having a hybrid configuration in which these fibers are combined.

Examples of the inorganic fiber include a carbon fiber, a graphite fiber, a silicon carbide fiber, an alumina fiber, a tungsten carbide fiber, a boron fiber, a glass fibers, etc. Examples of the organic fiber include an aramid fiber, a high density polyethylene fiber, other common nylon fibers, a polyester fiber, etc. Examples of the metal fiber include a fiber of stainless steel, iron, etc. and may include a carbon fiber coated with metal. Among these fibers, the carbon fiber is preferable in consideration of a mechanical property such as strength of molded body.

The reinforced fiber (f1) may be a continuous fiber or a discontinuous fiber. The continuous fiber is excellent in a mechanical property while the discontinuous fiber is excellent in a shaping property. Thus, the fibers may be selectively used as required. However, the discontinuous fiber is preferable from a viewpoint of a balance between the mechanical property and the shaping property. Examples of a mode of a reinforced fiber base material that forms the prepreg include a mode in which a large number of continuous fibers are aligned in one direction to form a UD sheet (unidirectional sheet), a mode in which a continuous fiber is woven to form a cross material (woven fabric), a mode in which these reinforced fibers are notched to form discontinuous fibers, a mode of forming a nonwoven fabric made of discontinuous fibers, a mode in which discontinuous fibers are kneaded and dispersed in a resin by a twin-screw extruder, etc. Examples of a scheme of weaving a cloth material include plain weave, twill weave, satin weave, triaxial weave, etc.

A number average fiber length of the reinforced fiber (f1) is preferably 1 to 100 mm, more preferably 3 to 70 mm, even more preferably 5 to 50 mm, particularly preferably 10 to 50 mm, and most preferably 10 to 35 mm. When the number average fiber length of the reinforced fiber (f1) is greater than or equal to the above-mentioned lower limit, a molded body having a sufficient mechanical property is easily obtained. When the number average fiber length of the reinforced fiber (f1) is less than or equal to the above-mentioned upper limit, the fiber reinforced composite material is easily shaped into a complicated shape such as a 3D shape.

A thermoplastic resin or a thermosetting resin may be used as the matrix resin (A). In these resins, the thermoplastic resin is preferable as the matrix resin (A).

The thermoplastic resin is not particularly restricted. Examples of the thermoplastic resin include a polyamide resin (nylon 6, nylon 66, nylon 12, nylon MXD 6, etc.), a polyolefin resin (low density polyethylene, high density polyethylene, polypropylene, etc.), a modified polyolefin resin (modified polypropylene resin, etc.), a polyester resin (polyethylene terephthalate, polybutylene terephthalate, etc.), a polycarbonate resin, a polyamide imide resin, a polyphenylene oxide resin, a polysulfone resin, a polyether sulfone resin, a polyether ether ketone resin, a polyether imide resin, a polystyrene resin, an ABS resin, a polyphenylene sulfide resin, a liquid crystal polyester resin, a copolymer of acrylonitrile and styrene, a copolymer of nylon 6 and nylon 66, etc.

Examples of the modified polyolefin resin include a resin obtained by modifying a polyolefin resin using an acid such as maleic acid.

A polyolefin resin, a modified polypropylene resin, a polyamide resin, or a polycarbonate resin is preferable as the thermoplastic resin from a viewpoint of balancing adhesiveness with respect to the reinforced fiber, an impregnation property with respect to the reinforced fiber and raw material cost of the thermoplastic resin. One type may be used alone, or two or more types may be used in combination as the thermoplastic resin.

Examples of the thermosetting resin include an epoxy resin, an unsaturated polyester resin, a vinyl ester resin, a phenol resin, a urethane resin, etc. One type may be used alone, or two or more types may be used in combination as the thermosetting resin. The thermosetting resin may be in a partially or entirely uncured state or in a completely cured state at the time of molding and is in a cured state in the molded body.

A fiber volume fraction (Vf) in the composite member is preferably in a range of 10 to 65% by volume, more preferably in a range of 15 to 55% by volume, and still more preferably in a range of 20 to 45% by volume. When Vf is greater than or equal to a lower limit, a molded body having a sufficient mechanical property is easily obtained. When Vf is less than or equal to an upper limit, the fiber reinforced composite material is easily shaped.

Vf in the composite member refers to a value measured according to JIS K 7075.

An additive such as a flame retardant, a weathering resistance improver, an antioxidant, a heat stabilizer, an ultraviolet absorber, a plasticizer, a lubricant, a coloring agent, a compatibilizing agent, a conductive filler, etc. may be mixed with the composite member depending on targeted demand characteristics.

(Thermoplastic Resin (B))

The thermoplastic resin (B) that forms the rib portions is not particularly restricted. Examples thereof include the same resins as the thermoplastic resins given in the matrix resin (A). One type may be used alone, or two or more types may be used in combination as the thermoplastic resin (B). When the thermoplastic resin is used as the matrix resin (A), the thermoplastic resin (B) preferably corresponds to the same type of resin as the matrix resin (A) in terms of moldability and from a viewpoint that adhesion strength between the composite member and the rib portion in the obtained molded body increases.

The thermoplastic resin (B) may contain an additive such as a reinforced fiber, a flame retardant, a weathering resistance improver, an antioxidant, a heat stabilizer, an ultraviolet absorber, a plasticizer, a lubricant, a coloring agent, a compatibilizing agent, a conductive filler, etc. depending on targeted demand characteristics of the molded body.

In the molded body of the invention, the rib portion may be formed using only the thermoplastic resin (B), or formed using the thermoplastic resin (B) and the reinforced fiber (f2) having a number average fiber length less than 1 mm. The same type as that given in the reinforced fiber (f1) may be used as a type of the reinforced fiber (f2), and the carbon fiber is preferable.

A fiber mass fraction of the reinforced fiber (f2) in the rib portion is preferably 40% by mass or less, more preferably 30% by mass or less, and even more preferably 25% by mass or less. When the fiber mass fraction of the reinforced fiber (f2) is less than or equal to the above-mentioned upper limit, the material is easily filled in the rib portion, and moldability is excellent. The fiber mass fraction of the reinforced fiber (f2) in the rib portion is preferably 10% by mass or more, and more preferably 15% by mass or more from a viewpoint that strength of the rib portion is easily sufficiently obtained.

The "fiber mass fraction of the reinforced fiber (f2) in the rib portion" refers to a ratio of total mass of the reinforced fiber (f2) to total mass of the rib portion.

A rib portion in which the reinforced fiber (f1) having a number average fiber length of 1 to 100 mm is contained in a root side portion and a distal end portion is formed using only the thermoplastic resin (B) is preferable as the rib portion in the molded body of the invention. The rib portion has high strength and easily exhibits the warp suppressing effect.

A rib portion in which the reinforced fiber (f1) having a number average fiber length of 1 to 100 mm is contained in a root side portion and a distal end portion is formed using the thermoplastic resin (B) and the reinforced fiber (f2) having a number average fiber length less than 1 mm is preferable as the rib portion in the molded body of the invention. The rib portion has high strength and easily exhibits the warp suppressing effect.

A fiber mass fraction of the reinforced fiber (f2) in the distal end portion of the rib portion is preferably 30% by mass or less, more preferably 25% by mass or less, and even more preferably 20% by mass or less. In this way, the material is easily filled in the rib portion, and moldability is excellent. The fiber mass fraction of the reinforced fiber (f2) in the distal end portion of the rib portion is preferably 10% by mass or less, and more preferably 15% by mass or less from a viewpoint that strength of the distal end portion of the rib portion is easily sufficiently obtained.

The "distal end portion of the rib portion" refers to a portion corresponding to 20% from a distal end with respect to a height of the rib portion in a height direction of the rib portion. The "root side portion of the rib portion" refers to a portion on a root side of the distal end portion in the rib portion.

For example, the rib portion in which the reinforced fiber (f1) is contained in the root side portion is formed when a portion of the reinforced fiber (f1) in the fiber reinforced composite material flows and enters the root side portion of the rib portion at the time of molding.

A mode of the molded body of the invention may correspond to a mode in which the thermoplastic resin (B) is contained in the surface of the composite member shaped from the fiber reinforced composite material, and two or more rib portions satisfying conditions (1') to (5') are formed, and is not restricted to the molded bodies 11 to 16. For example, even though the composite members 110 of the molded bodies 11 to 16 have the plate shape, the composite member in the molded body of the invention may be bent or curved.

Examples of the mold of the molded body of the invention include a mode in which the composite member includes a first plate-shaped portion and a second plate-shaped portion rising from the first plate-shaped portion, and the rib portion is formed on a surface of the first plate-shaped portion on which the second plate-shaped portion is provided (hereinafter also referred to as "mode (i)").

Figure 7:
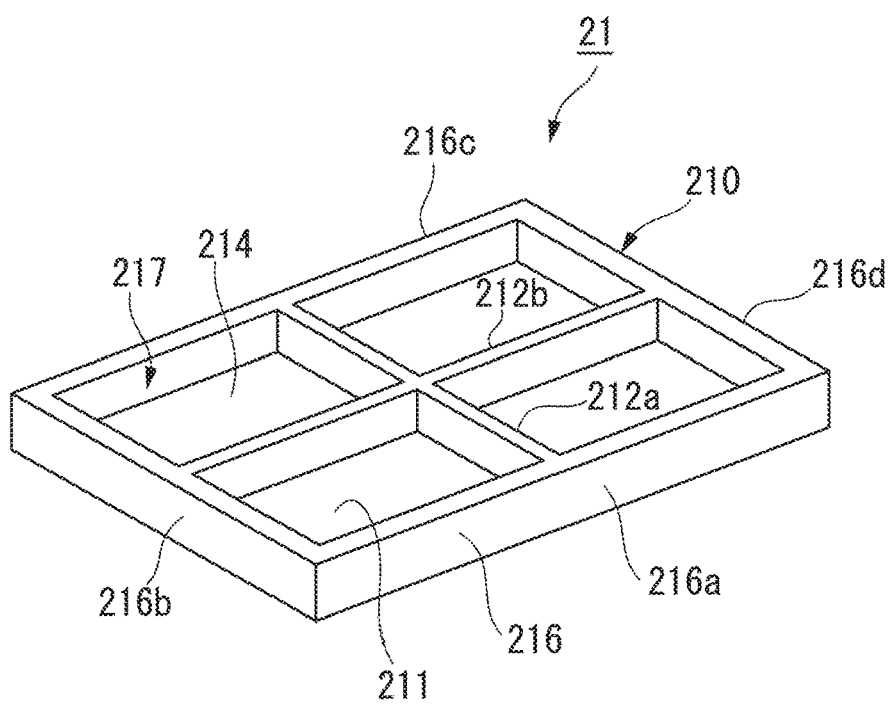
FIG. 7 is a perspective view illustrating another example of the molded body of the invention.

Specific examples of mode (i) include a molded body 21 illustrated in FIG. 7.

The molded body 21 includes a composite member 210 formed by shaping the fiber reinforced composite material, and a first rib portion 212*a* and a second rib portion 212*b* corresponding to protruding stripes which are formed on a first surface 211 of the composite member 210, contain the thermoplastic resin (B), and satisfy conditions (1) to (5).

The composite member 210 includes a first plate-shaped portion 214 having a rectangular shape in a plan view and a second plate-shaped portion 216 vertically rising from a circumference of the first plate-shaped portion 214 across the whole circumference. In this way, the composite member 210 has a box shape including the first plate-shaped portion 214 forming a bottom surface and the second plate-shaped portion 216 forming four side surfaces. In this way, the composite member 210 has a bent portion 217 at a connection part between the first plate-shaped portion 214 and the second plate-shaped portion 216.

The first rib portion 212*a* and the second rib portion 212*b* are made of a rectangular plate piece. The first rib portion 212*a* and the second rib portion 212*b* are formed on the first surface 211 of the first plate-shaped portion 214 on which the second plate-shaped portion 216 is provided.

The first rib portion 212*a* is linearly formed from a portion 216*a* forming one side surface of the second plate-shaped portion 216 to a portion 216*c* forming a side surface facing the portion 216*a*. An angle formed by the first rib portion 212*a* and the portion 216*a* of the second plate-shaped portion 216 in a front view of the molded body 21 viewed from the rib portion side is a vertical angle. Similarly, an angle formed by the first rib portion 212*a* and the portion 216*c* of the second plate-shaped portion 216 in the front view of the molded body 21 viewed from the rib portion side is a vertical angle.

The second rib portion 212*b* is linearly formed from a portion 216*b* forming one side surface between the portion 216*a* and the portion 216*c* in the second plate-shaped portion 216 to a portion 216*d* forming a side surface facing the portion 216*b*. An angle formed by the second rib portion 212*b* and the portion 216*b* of the second plate-shaped portion 216 in the front view of the molded body 21 viewed from the rib portion side is a vertical angle. Similarly, an angle formed by the second rib portion 212*b* and the portion 216*d* of the second plate-shaped portion 216 in the front view of the molded body 21 viewed from the rib portion side is a vertical angle.

In mode (i), an angle of a connection part between the rib portion and the second plate-shaped portion in the front view of the molded body viewed from the rib portion side may not be the vertical angle.

In this way, in the front view of the molded body 21 viewed from the rib portion side, the first rib portion 212*a* and the second rib portion 212*b* intersect each other in a cross shape, and an inner surface of the plate-shaped portion 216 in the first plate-shaped portion 214 is divided into four parts. In this example, four divided regions on the first surface 211 on the inside of the second plate-shaped portion 216 in the first plate-shaped portion 214 are even. When a region inside the second plate-shaped portion of the first plate-shaped portion is evenly divided by the rib portions in this way, an effect that occurrence of warping in the composite member due to a force applied from the mold at the time of demolding or a temperature difference is suppressed is further enhanced.

In the invention, it is preferable that a plurality of rib portions is formed to intersect each other as the first rib portion 212a and the second rib portion 212b in the molded body 21. In this way, the warp suppressing effect is further enhanced.

In the case of the molded body of mode (i), one end portion or both end portions in the lengthwise direction of the rib portion provided in the first plate-shaped portion are preferable connected to the second plate-shaped portion. For example, in the molded body 21, both end portions of the first rib portion 212a are connected to the portion 216a and the portion 216c in the second plate-shaped portion 216, respectively. Both end portions of the second rib portion 212b are connected to the portion 216b and the 216d in the second plate-shaped portion 216, respectively.

The warp suppressing effect is easily obtained when one end portion or both end portions in the lengthwise direction of the rib portion provided in the first plate-shaped portion are preferable connected to the second plate-shaped portion as described above.

The molded body of mode (i) is not restricted to the above-described molded body 21.

Figure 8:
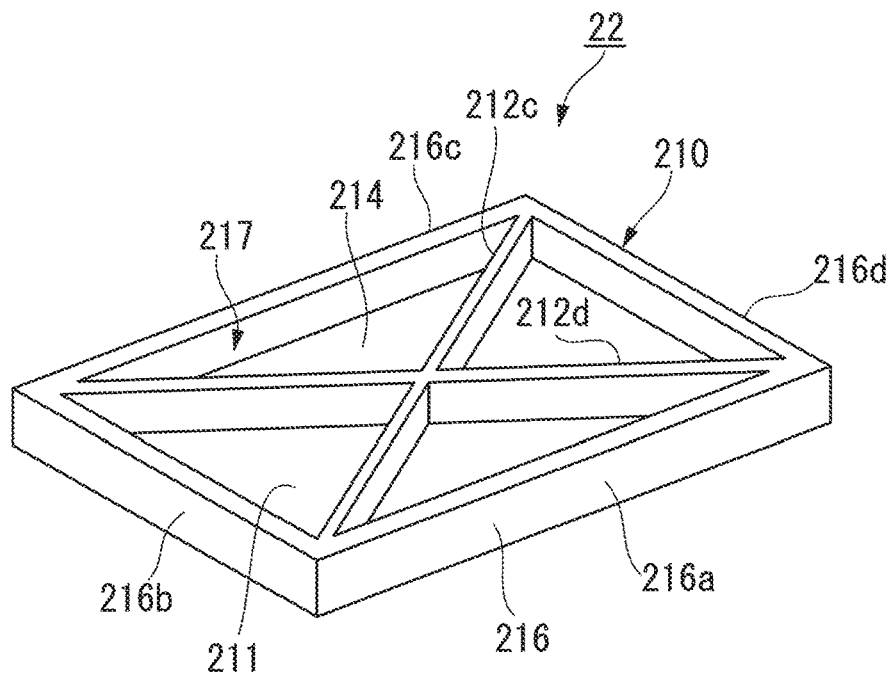
FIG. 8 is a perspective view illustrating another example of the molded body of the invention.

In addition to the molded body 21, a molded body 22 illustrated in FIG. 8 is given as an example of the molded body of mode (i) of the invention. The same reference symbol will be assigned to the same portion in FIG. 8 as that in FIG. 7, and a description will be omitted.

The molded body 22 includes a composite member 210 formed by shaping the fiber reinforced composite material, and a first rib portion 212c and a second rib portion 212d corresponding to protruding stripes which are formed on a first surface 211 of the composite member 210, contain the thermoplastic resin (B), and satisfy conditions (1') to (5'). The molded body 22 is the same as the molded body 21 except that the first rib portion 212c and the second rib portion 212d are included in place of the first rib portion 212a and the second rib portion 212b.

The first rib portion 212c and the second rib portion 212d are made of a rectangular plate piece. The first rib portion 212c and the second rib portion 212d are formed on the first surface 211 in a first plate-shaped portion 214 on which a second plate-shaped portion 216 is provided.

The first rib portion 212c is linearly formed from a corner portion formed by a portion 216a and a portion 216b to a corner portion formed by a portion 216c and a portion 216d in the plate-shaped portion 216. The second rib portion 212d is linearly formed from a corner portion formed by the portion 216b and the portion 216c to a corner portion formed by the portion 216d and the portion 216a in the plate-shaped portion 216.

In this way, in a front view of the molded body 22 viewed from the rib portion side, the first rib portion 212c and the second rib portion 212d are formed on diagonal lines to intersect each other.

In the molded body 22, since the first rib portion 212c and the second rib portion 212d satisfying conditions (1') to (5') are formed, warping resulting from a force applied from the mold at the time of demolding or a temperature difference hardly occurs. In addition, in the molded body 22, the first rib portion 212c and the second rib portion 212d are formed to intersect each other, and both end portions of the first rib portion 212c and the second rib portion 212d in the lengthwise direction are connected to the second plate-shaped portion 216. For this reason, similarly to the molded body 21, the molded body 22 has a higher warp suppressing effect.

Figure 9:
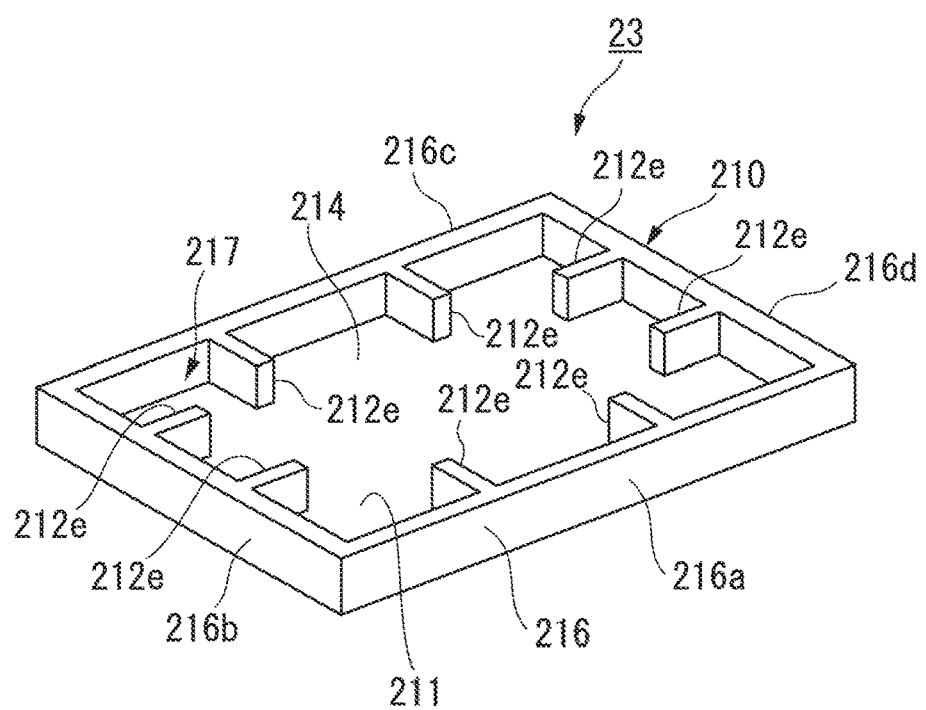
FIG. 9 is a perspective view illustrating another example of the molded body of the invention.

The molded body of mode (i) of the invention may correspond to a molded body 23 illustrated in FIG. 9. The same reference symbol will be assigned to the same portion in FIG. 9 as that in FIG. 7, and a description will be omitted.

The molded body 23 includes a composite member 210 formed by shaping the fiber reinforced composite material, and a plurality of rib portions 212e which is formed on a first surface 211 of the composite member 210, contains the thermoplastic resin (B), and satisfies conditions (1') to (5'). The molded body 23 is the same as the molded body 21 except that the plurality of rib portions 212e is included in place of the first rib portion 212a and the second rib portion 212b.

The rib portions 212e are made of a rectangular plate piece. The rib portions 212e are formed on the first surface 211 in a first plate-shaped portion 214 on which a second plate-shaped portion 216 is provided.

In the molded body 23, in a front view viewed from a side of the rib portions 212e, two rib portions 212e are formed side by side in a lengthwise direction of a portion 216a in the second plate-shaped portion 216 to protrude inward from the portion 216a. Similarly, in the front view viewed from the side of the rib portions 212e, two rib portions 212e are formed side by side in a lengthwise direction of each of a portion 216b, a portion 216c, and a portion 216d in the second plate-shaped portion 216 to protrude inward from each of the portion 216b, the portion 216c, and the portion 216d.

In this way, in the molded body 23, eight rib portions 212e are formed on a surface of the first plate-shaped portion 214 on the second plate-shaped portion 216 side. The eight rib portions 212e doe not directly intersect each other. However, extended lines of long axes of rib portions 212e protruding from the portion 216a and the portion 216c of the second plate-shaped portion 216 intersect with extended lines of long axes of rib portions 212e protruding from the portion 216b and the portion 216d of the second plate-shaped portion 216 on the first surface 211 of the first plate-shaped portion 214 in the composite member 210.

In the molded body 23, since the rib portions 212e satisfying conditions (1) to (5) are formed, warping resulting from a force applied from the mold at the time of demolding or a temperature difference hardly occurs. In addition, the molded body 23 has a higher warp suppressing effect since one end portion of the rib portion 212e in the lengthwise direction is connected to the second plate-shaped portion 216.

Figure 10:
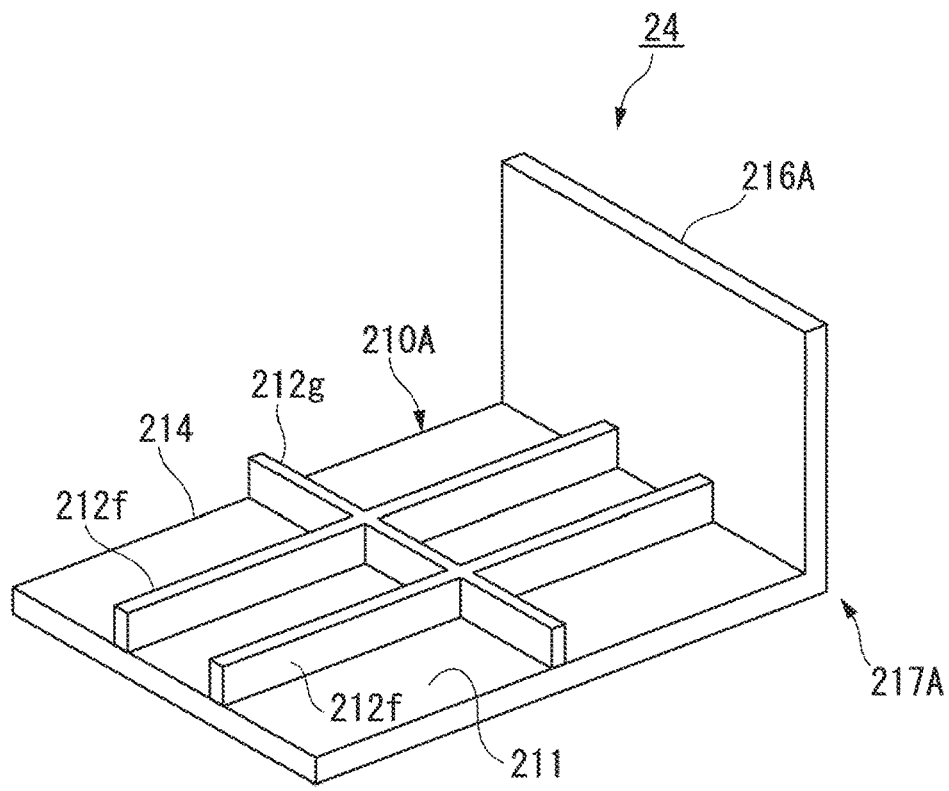
FIG. 10 is a perspective view illustrating another example of the molded body of the invention.

In the molded body of mode (i) of the invention, the composite member may not have the box shape unlike the molded bodies 21 to 23. For example, the molded body of mode (i) of the invention may correspond to a molded body 24 illustrated in FIG. 10. The same reference symbol will be assigned to the same portion in FIG. 10 as that in FIG. 7, and a description will be omitted.

The molded body 24 includes a composite member 210A formed by shaping the fiber reinforced composite material, and two rib portions 212f and 212f and one rib portion 212g which are formed on a first surface 211 of the composite member 210A, contain the thermoplastic resin (B), and satisfy conditions (1') to (5').

The composite member 210A includes a first plate-shaped portion 214 having a rectangular planar shape and a second plate-shaped portion 216A having a rectangular planar shape which vertically rises from one edge portion of the first plate-shaped portion 214. In this way, the composite member 210A has a bent portion 217A at a connection part between the first plate-shaped portion 214 and the second plate-shaped portion 216A.

The rib portion 212f and the rib portion 212g are made of a rectangular plate piece.

In the molded body 24, the two rib portions 212f are formed side by side to extend from the second plate-shaped portion 216A to an edge portion facing the second plate-shaped portion 216A on the first surface 211 of the first plate-shaped portion 214 on the second plate-shaped portion 216A side. In addition, the rib portion 212g is formed to be orthogonal to the two rib portions 212f on the first surface 211 of the first plate-shaped portion 214 on the second plate-shaped portion 216A side.

In the molded body 24, since the rib portions 212f and the rib portion 212g satisfying conditions (1') to (5') are formed, warping resulting from a force applied from the mold at the time of demolding during manufacture or a temperature difference hardly occurs. In addition, the molded body 24 has a higher warp suppressing effect since the rib portions 212f and the rib portion 212g are formed to intersect each other, and the one end portion of the rib portion 212f in the lengthwise direction is connected to the second plate-shaped portion 216A.

Figure 11:
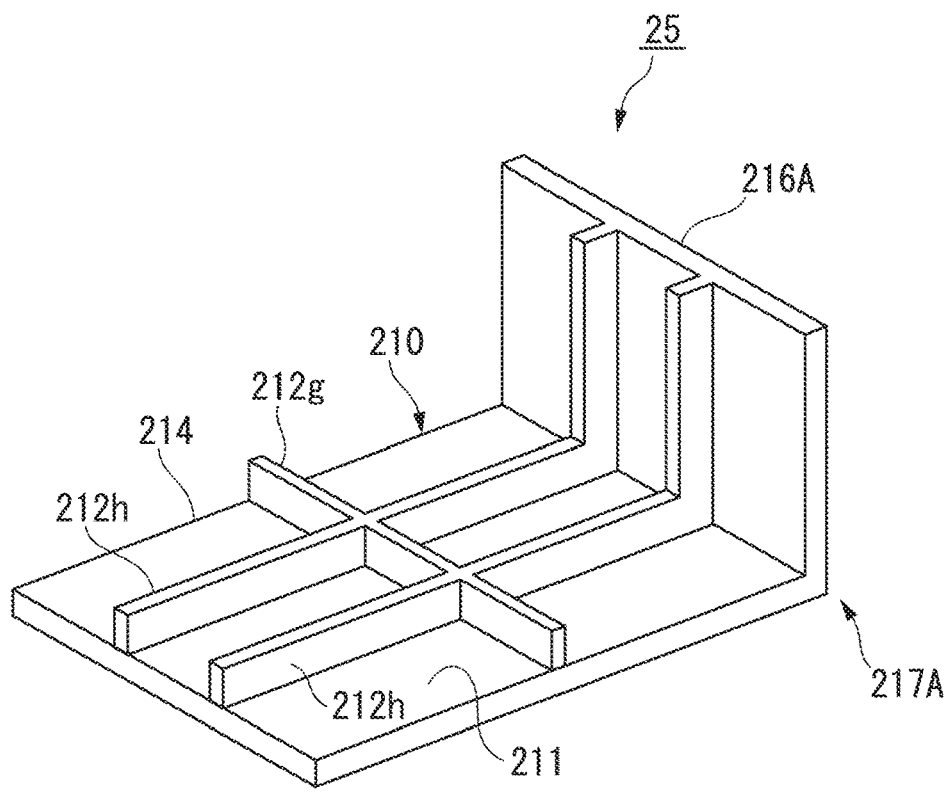
FIG. 11 is a perspective view illustrating another example of the molded body of the invention.

In the molded body of mode (i), a rib portion extending from a surface of a first plate-shaped portion on a second plate-shaped portion side to a surface of the second plate-shaped portion on the first plate-shaped portion side may be formed. For example, a molded body 25 illustrated in FIG. 11 may be employed. The same reference symbol will be assigned to the same portion in FIG. 11 as that in FIG. 7, and a description will be omitted.

The molded body 25 includes a composite member 210 formed by shaping the fiber reinforced composite material, and two rib portions 212h and one rib portion 212g which are formed on a first surface 211 of the composite member 210, contain the thermoplastic resin (B), and satisfy conditions (1') to (5'). The molded body 25 is the same as the molded body 24 except that the rib portions 212h are included in place of the rib portions 212f.

The rib portion 212h is a plate piece having an L-shaped planar shape having a rectangular plate-shaped part formed from an end portion of a first plate-shaped portion 214 on the second plate-shaped portion 216A side to an end portion facing the end portion, and a rectangular plate-shaped part formed to rise from an end portion of the plate-shaped part on the second plate-shaped portion 216A side along the second plate-shaped portion 216A.

In the molded body 25, the two rib portions 212h having the L-shaped planar shape are formed to extend from a surface of the first plate-shaped portion 214 on the second plate-shaped portion 216A side to a surface of the second plate-shaped portion 216A on the first plate-shaped portion 214 side. In addition, the rib portion 212g is formed to be orthogonal to the two rib portions 212h on the surface of the first plate-shaped portion 214 on the second plate-shaped portion 216A side. That is, the two rib portions 212h and the rib portion 212g intersect each other on the first surface 211 of the composite member 210.

When the rib portion is provided on both the first plate-shaped portion and the second plate-shaped portion as in the molded body 25, it is preferable that the ratio $S_R/S$ in a front view of the first plate-shaped portion viewed from the rib portion side and the ratio $S_R/S$ in a front view of the second plate-shaped portion viewed from the rib portion side satisfy the range of condition (3').

In the molded body 25, since the rib portions 212h and the rib portion 212g satisfying conditions (1') to (5') are formed, warping resulting from a force applied from the mold at the time of demolding during manufacture or a temperature difference hardly occurs. In addition, the molded body 25 has a higher warp suppressing effect since the rib portions 212h and the rib portion 212g are formed to intersect each other, and the two rib portions 212h are formed from the first plate-shaped portion 214 across the second plate-shaped portion 216A.

Figure 12:
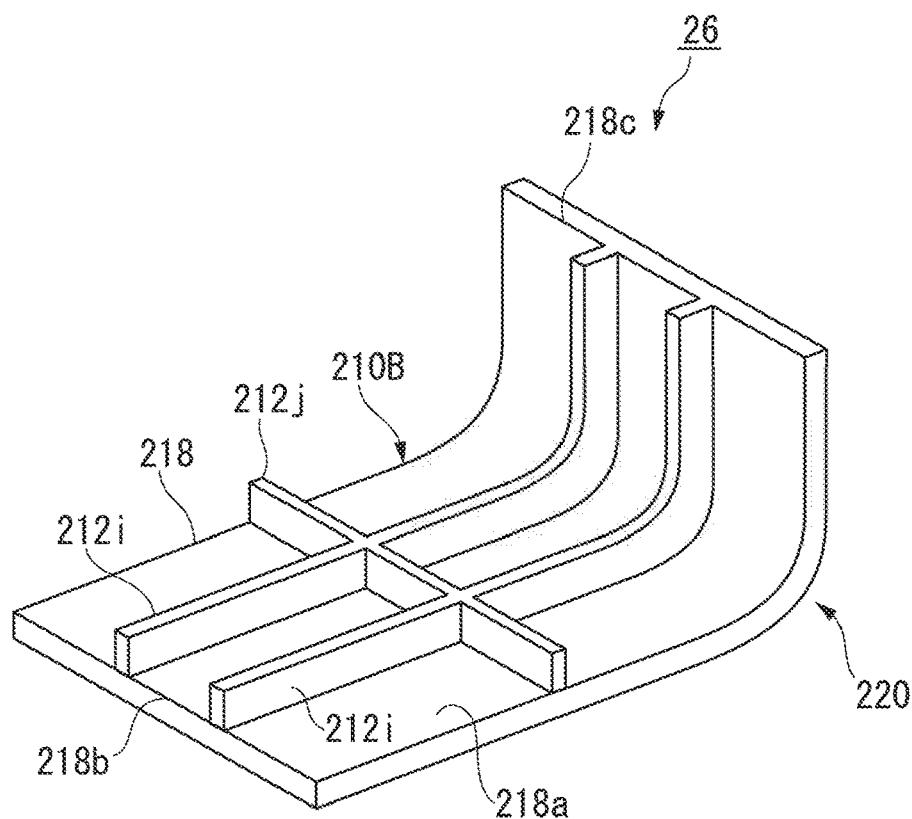
FIG. 12 is a perspective view illustrating another example of the molded body of the invention.

The molded body of the invention may correspond to a mode (hereinafter also referred to "mode (ii)") in which a composite member includes a plate-shaped portion, and a rib portion is formed on a concave surface in the plate-shaped portion. Specifically, for example, it is possible to employ a molded body 26 illustrated in FIG. 12.

The molded body 26 includes a composite member 210B formed by shaping the fiber reinforced composite material, and two rib portions 212i and one rib portion 212j which are formed on a concave surface 218a of the composite member 210B, contain the thermoplastic resin (B), and satisfy conditions (1') to (5').

The composite member 210B includes a plate-shaped portion 218 in which one side in a lengthwise direction is curved to rise. In this way, the composite member 210B has a curved portion 220.

The rib portions 212i are made of an elongated plate piece, and two rib portions 212i are formed side by side to extend from a first end portion 218b to a second end portion 218c in the lengthwise direction of the plate-shaped portion 218 on the concave surface 218a in the plate-shaped portion 218. A planar shape of the rib portion 212i is curved along the concave surface 218a of the plate-shaped portion 218.

The rib portion 212j is made of a rectangular plate piece. The rib portion 212j is formed to be orthogonal to the two rib portions 212i on the first end portion 218b side of the curved portion 220 on the concave surface 218a in the plate-shaped portion 218.

With regard to the ratio $S_R/S$ in mode (ii), a total area of the concave surface of the plate-shaped portion is set to S on the assumption that the concave surface is a flat surface, and an area occupied by the rip portion on the concave surface of the plate-shaped portion is set to $S_R$ on the assumption that the concave surface is a flat surface.

In the molded body 26, since the rib portions 212i and the rib portion 212j satisfying conditions (1') to (5') are formed, warping resulting from a force applied from the mold at the time of demolding during manufacture or a temperature difference hardly occurs.

Warping of a composite member resulting from a force applied from the mold at the time of demolding during manufacture or a temperature difference particularly easily occurs in the case of manufacturing a molded body including a composite member that has a bent portion or a curved portion as in mode (i) and mode (ii). For this reason, the invention is particularly effective when the bent portion or the curved portion is included as in mode (i) and mode (ii).

In a molded body that includes a composite material obtained by shaping a lump, etc. of the fiber reinforced composite material into a plate shape using stamping molding, warping resulting from a force applied from the mold at the time of demolding during manufacture or a temperature difference may occur when a rib portion is not formed. For this reason, in this case, a warp suppressing effect is obtained by forming a rib portion.

In the molded body of the invention, the rib portion may be curved in a front view of the composite member viewed from the rib portion side.

In the molded body of the invention, the rib portion is preferably formed on only one surface of the plate-shaped composite member in the thickness direction. However, the rib portion may be formed on both surfaces of the composite member in the thickness direction.

In the molded body of the invention described above, warping resulting from a force applied from the mold at the time of demolding during manufacture or a temperature difference is suppressed since the rib portion satisfying conditions (1') to (5') is formed.

[Method for Manufacturing Molded Body]

Hereinafter, a description will be given of a method for manufacturing a molded body of the invention. The method for manufacturing the molded body of the invention is a method for manufacturing a molded body that includes the plate-shaped composite member made of the fiber reinforced composite material containing the reinforced fiber (f1) and the matrix resin (A), and rib portions corresponding to two or more convex stripes which are directly formed on a surface of the composite member and contain the thermoplastic resin (B). In the method for manufacturing the molded body of the invention, molding is performed by supplying the thermoplastic resin (B) in the molten state in a state in which the fiber reinforced composite material containing the reinforced fiber (f1) and the matrix resin (A) is disposed in the mold. That is, the method for manufacturing the molded body of the invention is a method for integrally injection molding a rib portion made of the thermoplastic resin in the same mold when the fiber reinforced composite material containing the reinforced fiber and the matrix resin (A) is shaped by stamping molding to form the composite member.

The method for manufacturing the molded body of the invention includes a composite member formation process and a rib portion formation process described below.

Composite member formation process: Process of forming the composite member by shaping the fiber reinforced composite material using the mold Rib portion formation process: Process of forming rib portions satisfying conditions (1) to (5) below by supplying the thermoplastic resin (B) in the molten state into the mold (1) An arbitrary rib portion or an extended line of a long axis thereof intersects with another rib portion or an extended line of a long axis thereof on a surface of the composite member.

(2) A ratio H/t of an average height H to an average width t of the rib portions is 1 or more and 50 or less.

(3) A ratio $S_R/S$ of an area $S_R$ occupied by the rib portions on a surface of the composite member on a side at which the rib portions are formed to an area S of the surface is $5.0 \times 10^{-3}$ or more and less than $8.0 \times 10^{-2}$.

(4) A ratio $H/T_I$ of the average height H of the rib portions to an average thickness $T_I$ of the composite member is 2.5 or more and 13 or less.

(5) A ratio Q of a length of at least one rib portion to a circumferential length of an outer edge of the composite member is 8% or more.

Hereinafter, a description will be given of a case of manufacturing the molded body 21 as an example.

(Mold)

Figure 13:
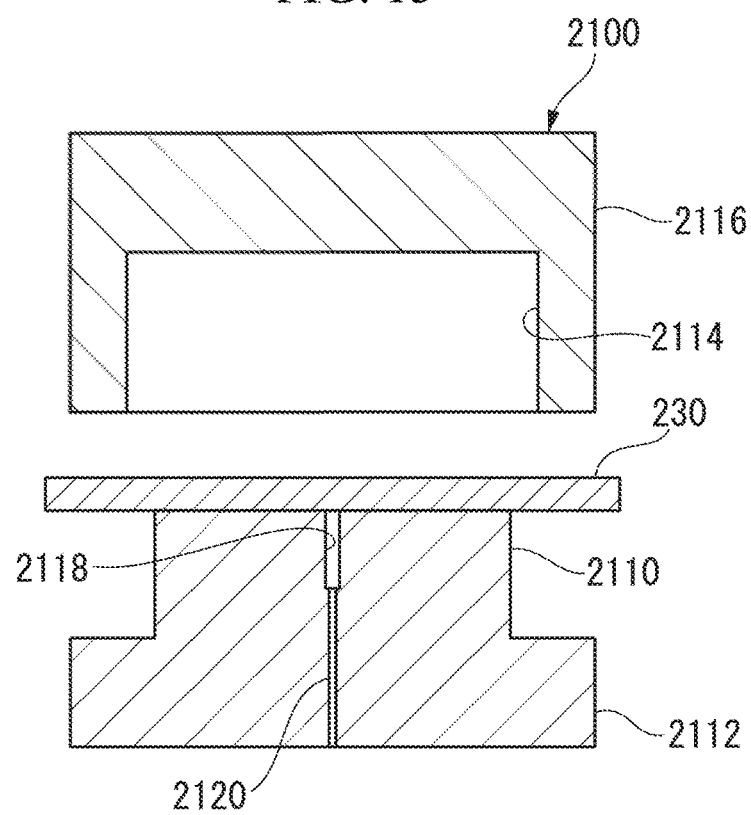
FIG. 13 is a cross-sectional view illustrating one process of a method for manufacturing the molded body of the invention.

A mold 2100 illustrated in FIG. 13 is given as an example of a mold for manufacturing the molded body 21.

The mold 2100 includes a lower mold 2112 having a convex portion 2110 protruding upward and an upper mold 2116 having a concave portion 2114 on a lower surface side. A groove portion 2118 having a shape complementary to the shapes of the first rib portion 212a and the second rib portion 212b of the molded body 21, and a resin flow path 2120 for supplying the thermoplastic resin (B) to the groove portion 2118 are formed on an upper surface of the convex portion 2110 of the lower mold 2112. When the mold 2100 is closed, a space (cavity) having a shape complementary to the shape of the molded body 21 is formed.

(Composite Member Formation Process)

Figure 14:
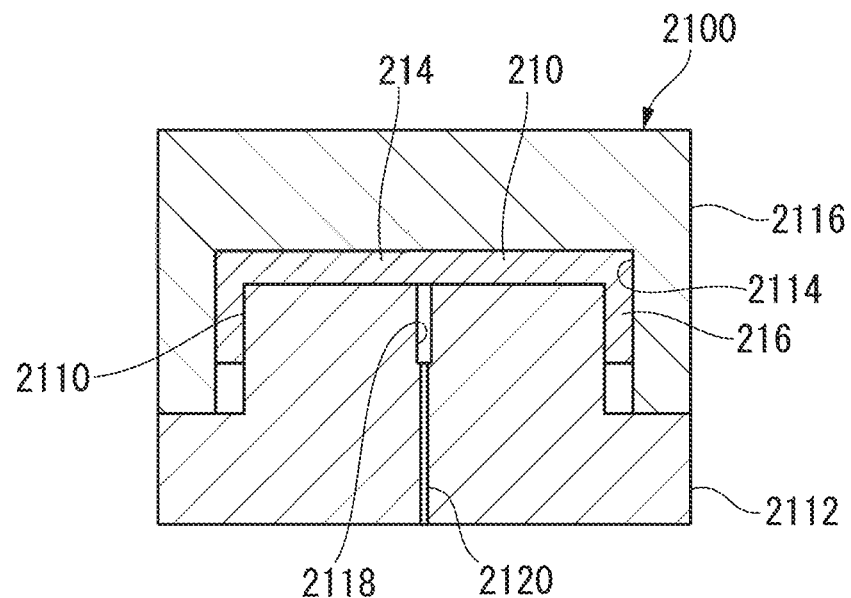
FIG. 14 is a cross-sectional view illustrating one process of a method for manufacturing the molded body of the invention.

As illustrated in FIG. 13, a sheet-shaped fiber reinforced composite material 230 containing the reinforced fiber and the matrix resin (A) is disposed on the convex portion 2110 of the lower mold 2112 in the mold 2100. Subsequently, as illustrated in FIG. 14, the mold 2100 is closed in a state in which the fiber reinforced composite material 230 is disposed, and the fiber reinforced composite material 230 is shaped to form the composite member 210.

When a thermoplastic resin is used as the matrix resin (A), the fiber reinforced composite material is heated above a softening temperature of the thermoplastic resin. The softening temperature of the thermoplastic resin is a melting temperature (melting point) of the thermoplastic resin when the thermoplastic resin is a crystalline resin and is a glass transition temperature of the thermoplastic resin when the thermoplastic resin is an amorphous resin. These temperatures refer to values measured by a differential scanning calorimetry (DSC) method according to JIS K 7121.

When a thermosetting resin is used as the matrix resin (A), the fiber reinforced composite material is heated above a curing temperature of the thermosetting resin. The curing temperature of the thermosetting resin is a temperature lower than a temperature, at which a heating peak is observed at a temperature rising rate of 10° C./minutes from room temperature, by 10° C., and refers to a value measured by the DSC method.

A sheet-shaped prepreg, a prepreg stacked body obtained by stacking a plurality of prepregs, etc. may be used as the fiber reinforced composite material.

In the invention, the fiber reinforced composite material may be disposed in the mold after being heated above the softening temperature or above the curing temperature, or may be heated above the softening temperature or above the curing temperature after being disposed in the mold.

A method for heating the fiber reinforced composite material is not particularly limited, and examples thereof include an infrared heater, etc.

When the thermoplastic resin is used as the matrix resin (A), a relation between a temperature T (° C.) of the fiber reinforced composite material at the time of shaping and the softening temperature $T_A$(° C.) of the thermoplastic resin corresponds to $T_A \leq T$. Further, $T_A+10(° C.) \leq T \leq T_A+150(° C.)$ is preferable, and $T_A+30(° C.) \leq T \leq T_A+100(° C.)$ is more preferable. When the temperature T is greater than or equal to a lower limit, a molded body in which a boundary surface between a composite member and a rib portion has high adhesion strength is obtained, and a molding time is shortened. When the temperature T is excessively high, there is a concern that a time required for the thermoplastic resin in the fiber reinforced composite material to solidify after mold clamping may increase to result in a decrease in productivity, or the thermoplastic resin in the fiber reinforced composite material may cause pyrolysis. However, when the temperature T is less than or equal to an upper limit, the time required for the thermoplastic resin in the fiber reinforced composite material to solidify after mold clamping is not an issue, and pyrolysis of the thermoplastic resin in the fiber reinforced composite material is easily suppressed.

When the thermoplastic resin is used as the matrix resin (A), a mold temperature at the time of mold clamping is preferably lower than a temperature corresponding to a lower one of softening temperatures of the matrix resin (A) and the thermoplastic resin (B) by 5° C. or more, and more preferably lower than the temperature by 15° C. or more. In this way, the matrix resin (A) and the thermoplastic resin (B) in the molded body are sufficiently cooled and solidified, and thus demolding from the mold is easy.

(Rib Portion Formation Process)

Figure 15:
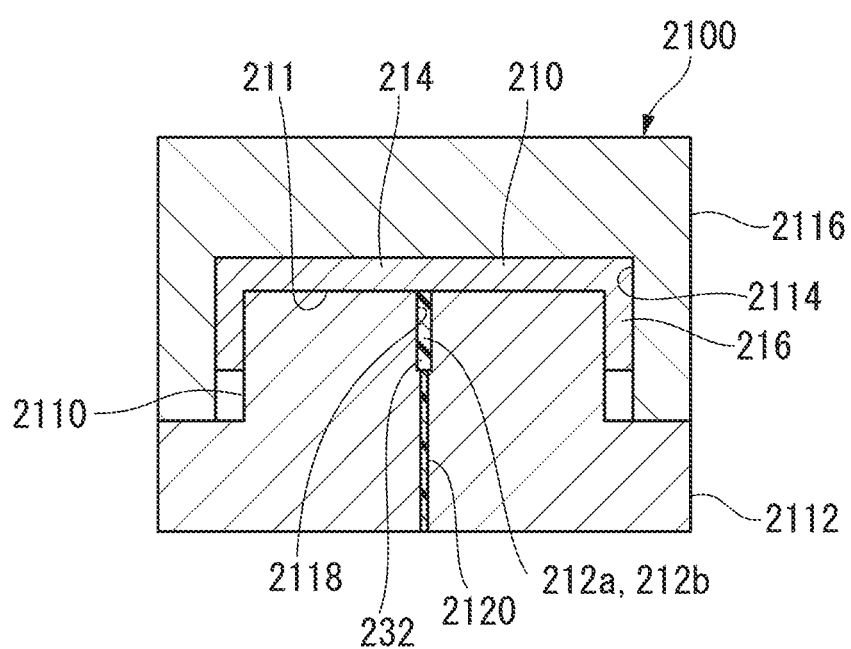
FIG. 15 is a cross-sectional view illustrating one process of a method for manufacturing the molded body of the invention.

As illustrated in FIG. 15, a thermoplastic resin (B) 232 is supplied in a molten state from the resin flow path 2120 to the groove portion 2118 in the mold 2100 to form the first rib portion 212a and the second rib portion 212b on the first surface 211 of the first plate-shaped portion 214 in the composite member 210 to satisfy conditions (1) to (5). The first rib portion 212a and the second rib portion 212b may be formed to satisfy conditions (1) to (5) by setting a shape of the groove portion 2118 to a shape complementary to the shapes of the first rib portion 212a and the second rib portion 212b satisfying conditions (1') to (5').

In the invention, it is preferable that after the mold is clamped to shape the fiber reinforced composite material, the mold is temporarily opened, the thermoplastic resin (B) is supplied in this state, and the thermoplastic resin (B) is molded integrally with the fiber reinforced composite material while pressing the thermoplastic resin (B) by closing the mold again. For example, when the molded body 21 is manufactured using the mold 2100, it is preferable that after the fiber reinforced composite material 230 is shaped, the upper mold 2116 is slightly spaced upward from the lower mold 2112, the thermoplastic resin (B) 232 is supplied in the molten state to the groove portion 2118, and then the mold 2100 is closed again to perform molding. In this way, the thermoplastic resin (B) supplied into the mold is easily pressed, and the groove portion forming the rib portions is easily sufficiently filled with the thermoplastic resin (B).

In addition, in this case, it is preferable that the mold is temporarily opened by an injection pressure when the thermoplastic resin (B) is injected after the mold is clamped to shape the fiber reinforced composite material from a viewpoint that it is possible to reduce the energy consumption for temporarily opening the mold, to shorten the molding time, or to simplify a mechanical design of the mold.

In the method for manufacturing the molded body of the invention, a composite containing the thermoplastic resin (B) and the reinforced fiber (12) having the number average fiber length less than 1 mm may be supplied to form the rib portions in the rib portion formation process.

As described above, in the method for manufacturing the molded body of the invention, when the fiber reinforced composite material is shaped using stamping molding to form the composite member, the rib portions are integrally injection-molded to satisfy conditions (1) to (5) in the same mold. For this reason, occurrence of warping resulting from a force applied at the time of demolding from the mold during manufacture or a temperature difference is suppressed in the obtained molded body.

The method for manufacturing the molded body of the invention may correspond to a method for integrally injection-molding rib portions made of the thermoplastic resin in the same mold when the fiber reinforced composite material is shaped using stamping molding to form the composite member, and is not restricted to a method for manufacturing the molded body 1. For example, the method may correspond to a method for manufacturing the molded body of the invention other than the molded body 21 such as the molded bodies 11 to 16 and 22 to 26, etc.

The above-described manufacturing method is a method for performing the rib portion formation process after performing the composite member formation process. However, in the method for manufacturing the molded body of the invention, the composite member formation process and the rib portion formation process may be simultaneously performed. That is, in the method for manufacturing the molded body of the invention, the thermoplastic resin (B) may be supplied into the mold to form the rib portions while shaping the fiber reinforced composite material.

Hereinafter, the invention will be described in detail using examples. However, the invention is not restricted by the following description.

[Evaluation of Warping (Simulation)]

(Used Software)

Evaluation of warping was performed by a simulation using CAE software. Solvers that perform calculation based on the CAE software are NX Nastran (made by Siemens) and static analysis module (SOL101). A simulation model includes an aggregate of shell elements having four nodes or three nodes.

(Evaluation Method)

In the simulation of each example, a condition that temperature falls from 200° C. by 180° C. was given as a load to calculate the amount of warping assuming a case in which temperature of a member is cooled to room temperature (20° C.)) after rising up to 200° C. at the time of molding. In addition, a condition that one mode located at a center of the composite member is completely constrained was set as a constraint condition. In the simulation, a distance (height) in the thickness direction between an uppermost part and a lowermost part in the composite member was set to the amount of warping. When the composite member has a complete flat plate shape, the amount of warping is 0 mm.

(Evaluation Criterion)

Evaluation of warping was performed according to the following criterion.

○: A decreasing rate of the amount of warping with respect to a reference example is 30% or more.

x: A decreasing rate of the amount of warping with respect to a reference example is less than 30%.

[Evaluation of Mass of Molded Body]

A mass increasing rate obtained by forming rib portions in a molded body of each example was calculated and evaluated according to the following criterion.

○: An increasing rate of mass with respect to a reference example is 20% or less.

x: An increasing rate of mass with respect to a reference example exceeds 20%.

[Evaluation of Strength and Moldability]

Strength and moldability of rib portions in a molded body of each example were evaluated according to the following criterion.

○: A crack or a missing part is not found in the rib portions, and sufficient strength and fluidity are achieved.

x: At least one of a crack or a missing part is found in the rib portions, and at least one of strength and fluidity is insufficient.

[Comprehensive Evaluation]

○: All the evaluation of warping, the evaluation of the mass of the molded body, and the evaluation of the strength and moldability correspond to "○".

x: At least one of the evaluation of warping, the evaluation of the mass of the molded body, and the evaluation of the strength and moldability corresponds to "X".

Reference Example A1

Input property values in the simulation were set with reference to an amount of warping of a molded body manufactured using a prepreg sheet described below. Specifically, a stacked body obtained by overlapping a plurality of prepreg sheets was disposed in a mold, heated to 200° C., and molded. Thereafter, the mold was opened after one minute to take out a molded body including only a length 120 mm×width 200 mm×thickness 1 mm flat plate-shaped composite member having a weigh of 28.8 g. A distance (height) in the thickness direction between an uppermost part and a lowermost part in the composite member was measured as the amount of warping, and 1.32 mm was obtained.

Prepreg sheet: A prepreg sheet obtained when a carbon fiber corresponding to the reinforced fiber (f1) (manufactured by Mitsubishi Rayon Co., Ltd., product name: Pyrophyl (registered trademark) TR-50S15L) is cut such that a number average fiber length is 25 mm, a random material dispersed such that fiber orientation is random is impregnated with a film made of acid-modified polypropylene resin corresponding to the matrix rein (A) (manufactured by Mitsubishi Chemical Co., Ltd., product name: MODIC (registered trademark)), and the fiber volume fraction (Vf) is set to 35%.

The input property values of the composite member in the simulation were set to reproduce the amount of warping (1.32 mm) in a length 120 mm×width 200 mm×thickness ($T_I$) 1 mm flat plate-shaped composite member having a weigh of 28.8 g. As specific input property values, an elastic modulus was set to 28.8 GPa, a shear modulus was set to 1.5 GPa, and a Poisson ratio was set to 0.33. In addition, with regard to a coefficient of linear expansion of the composite member, local unevenness was set to reproduce the amount of warping, and an average value of the whole composite member was set to 0.44 ($10^{-5}/°$ C.).

Example A1

Simulation was performed on the molded body 11 in which the first rib portion 112a and the second rib portion 112b corresponding to two rib portions are formed on the diagonal lines on the surface of the flat plate-shaped composite member 110 as illustrated in FIG. 1A and FIG. 1B. The dimensions and input property values of the composite member 110 were set to the same values as those in Reference Example A1. With regard to the first rib portion 112a and the second rib portion 112b, a cross-sectional shape was set to a rectangular shape, an average width t was set to 1 mm, an average height H was set to 5 mm, and a ratio H/t was set to 5.0. In addition, a ratio $S_R/S$ was set to 1.94×$10^{-2}$, and a ratio $H/T_I$ was set to 5.0. The mass of the composite member 110 was set to 28.8 g, the total mass of the first rib portion 112a and the second rib portion 112b was set to 2.2 g, and the total mass of the molded body 11 was set to 31.0 g.

A catalog value of a pellet material (manufactured by Mitsubishi Rayon Co., Ltd., product name: PP-C-20A) containing the thermoplastic resin (B) and the reinforced fiber (f2) was employed as an input property value of rip portions in an example of forming the rib portions. Specifically, 12.3 GPa corresponding to a value of a catalog in the MD direction (flow direction) was employed as the elastic modulus of the rib portions in the longitudinal direction, and 3 GPa corresponding to a value of the catalog in the TD direction (orthogonal direction) was employed as the elastic modulus of the rib portions in the orthogonal direction with respect to the longitudinal direction. In addition, a shear modulus was set to 1.5 GPa, a Poison ratio was set to 0.3, a coefficient of linear expansion in the MD direction was set to 0.5 ($10^{-5}/°$ C.), and a coefficient of linear expansion in the TD direction was set to 12.6 ($10^{-5}/°$ C.).

Evaluation of warping and evaluation of the mass of the molded body were performed based on Reference Example A1. An evaluation result is shown in Table 1.

Reference Example A2

In the same manner as in Example A1, simulation was performed on the molded body 12 in which the first rib portion 112a to the fourth rib portion 112d corresponding to four rib portions are formed on the surface of the flat plate-shaped composite member 110 as illustrated in FIG. 2. The first rib portion 112a and the second rib portion 112b were formed in the V shape on the line connecting the midpoint a6 of the second long side 110b to each of the both ends a1 and a2 of the first long side 110a. The third rib portion 112c and the fourth rib portion 112d were formed in the inverted V shape on the line connecting the midpoint a5 of the first long side 110a to each of the both ends a3 and a4 of the second long side 110b. The dimensions and masses of the composite member and the rib portions were set as shown in Table 1.

Evaluation of warping and evaluation of the mass of the molded body were performed based on Reference Example A1. An evaluation result is shown in Table 1.

Example A3

In the same manner as in Example A1, simulation was performed on the molded body 13 in which the first rib portion 112a to the fourth rib portion 112d corresponding to four rib portions are formed on the surface of the flat plate-shaped composite member 110 as illustrated in FIG. 3. The first rib portion 112a and the second rib portion 112b were formed in the V shape on the line connecting a point a7, which bisects the segment between the left end a3 and the midpoint a6 of the second long side 110b, to each of the left end at and the midpoint a5 of the first long side 110a. The third rib portion 112c and the fourth rib portion 112d are formed in the V shape on the line connecting a point a8, which bisects the segment between the midpoint a6 and the right end a4 of the second long side 110b, to each of the midpoint a5 and the right end a2 of the first long side 110a. The dimensions and masses of the composite member and the rib portions were set as shown in Table 1.

Evaluation of warping and evaluation of the mass of the molded body were performed based on Reference Example A1. An evaluation result is shown in Table 1.

Example A4

In the same manner as in Example A1, simulation was performed on the molded body 14 in which the first rib portion 112a to the fourth rib portion 112d corresponding to four rib portions are formed on the surface of the flat plate-shaped composite member 110 as illustrated in FIG. 4. The molded body 14 was the same as the molded body 13 except that a part away from the point a7 by 10 mm in the first rib portion 112a, a part away from the point a7 by 10 mm and a part away from the midpoint a5 by 10 mm in the second rib portion 112b, a part away from the midpoint a5 by 10 mm and a part away from the point as by 10 mm in the third rib portion 112c, and a part away from the point a8 by 10 mm in the fourth rib portion 112d were removed.

Evaluation of warping and evaluation of the mass of the molded body were performed based on Reference Example A1. An evaluation result is shown in Table 1.

Examples A5 to A7

Simulation was performed in the same manner as in Example A1 except that the average thickness $T_I$ of the composite member and the average width t, the average height H, the ratio H/t, the ratio $S_R/S$, and the mass of the rib portions were changed as shown in Table 1.

Evaluation of warping and evaluation of the mass of the molded body were performed based on Reference Example A1. An evaluation result is shown in Table 1.

Comparative Example A1

Figure 16:
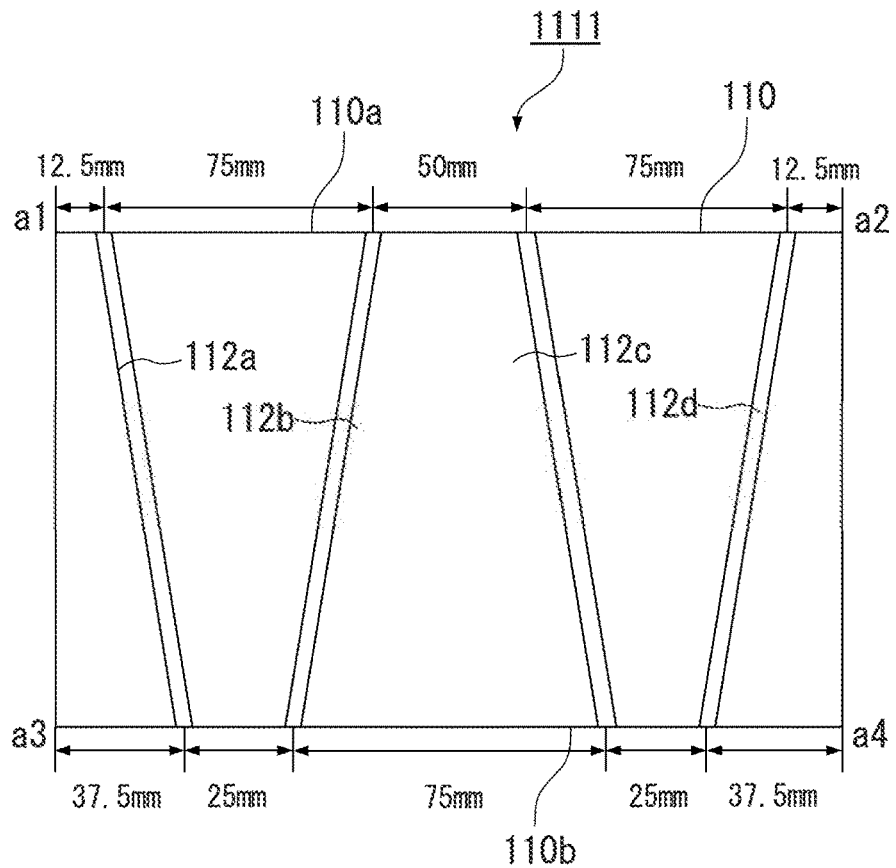
FIG. 16 is a plan view illustrating a molded body simulated in Comparative Example A1.

In the same manner as in Example A1, simulation was performed on a molded body 1111 in which a first rib portion 112a to a fourth rib portion 112d corresponding to four rib portions are formed on a surface of a flat plate-shaped composite member 110 as illustrated in FIG. 16. The first rib portion 112a was formed on a line connecting a spot away from a left end a1 of a first long side 110a by 12.5 mm to a spot away from a left end a3 of a second long side 110b by 37.5 mm. The second rib portion 112b was formed on a line connecting a spot away from the left end a1 of the first long side 110a by 87.5 mm to a spot away from the left end a3 of the second long side 110b by 62.5 mm. The third rib portion 112c was formed on a line connecting a spot away from a right end a2 of the first long side 110a by 87.5 mm to a spot away from a right end a4 of the second long side 110b by 62.5 mm. The fourth rib portion 112d was formed on a line connecting a spot away from the right end a2 of the first long side 110a by 12.5 mm to a spot away from the right end a4 of the second long side 110b by 37.5 mm. The dimensions and masses of the composite member and the rib portions were set as shown in Table 1.

Evaluation of warping and evaluation of the mass of the molded body were performed based on Reference Example A1. An evaluation result is shown in Table 1.

Reference Examples A2 and A3

Simulation was performed in the same manner as in Example A1 except that the average width t, the average height H, the ratio H/t, the ratio $S_R/S$, and the mass of the rib portions were changed as shown in Table 1.

Evaluation of warping and evaluation of the mass of the molded body were performed based on Reference Example A1. An evaluation result is shown in Table 1.

TABLE 1

| | | Reference Example | Comparative Example | | | Example | |
|---|---|---|---|---|---|---|---|
| | | A1 | A1 | A2 | A3 | A1 | A2 |
| Composite member | Length [mm] | 120 | 120 | 120 | 120 | 120 | 120 |
| | Width [mm] | 200 | 200 | 200 | 200 | 200 | 200 |
| | Average thickness $T_1$ [mm] | 1.0 | 1.0 | 1.0 | 1.0 | 1.0 | 1.0 |
| | Area S [mm²] | 24000 | 24000 | 24000 | 24000 | 24000 | 24000 |
| | Mass [g] | 28.8 | 28.8 | 28.8 | 28.8 | 28.8 | 28.8 |
| Rib portions | Average width t [mm] | — | 1.0 | 0.2 | 5.0 | 1.0 | 1.0 |
| | Average height H [mm] | — | 5.0 | 25.0 | 1.0 | 5.0 | 5.0 |
| | Ratio H/t | — | 5.0 | 125.0 | 0.2 | 5.0 | 5.0 |
| | Total length [mm] | — | 490.3 | 466.6 | 466.6 | 466.5 | 624.8 |
| | Area $S_R$ [mm²] | — | 490.3 | 93.3 | 2332.9 | 466.5 | 624.8 |
| | Mass [g] | — | 2.3 | 2.2 | 2.2 | 2.2 | 3.0 |
| Ratio $S_R/S$ (×10⁻²) | | — | 2.04 | 0.39 | 9.72 | 1.94 | 2.60 |
| Ratio $H/T_1$ | | — | 5.0 | 125.0 | 1.0 | 5.0 | 5.0 |
| Condition (1)/Condition (1') | | X | X | ○ | ○ | ○ | ○ |
| Condition (2)/Condition (2') | | X | ○ | X | X | ○ | ○ |
| Condition (3)/Condition (3') | | X | ○ | X | X | ○ | ○ |
| Condition (4)/Condition (4') | | X | ○ | X | X | ○ | ○ |
| Condition (5)/Condition (5') | | X | ○ | ○ | ○ | ○ | ○ |
| Evaluation of mass of molded body | Mass [g] | 28.8 | 31.1 | 31.0 | 31.0 | 31.0 | 31.8 |
| | Increasing rate [%] | Reference | 8.1 | 7.7 | 7.7 | 7.7 | 10.3 |
| | Judgment | — | ○ | ○ | ○ | ○ | ○ |
| Evaluation of warping | Amount of warping [mm] | 1.32 | 1.17 | 0.43 | 1.22 | 0.53 | 0.45 |
| | Decreasing rate [%] | Reference | 11.5 | 67.6 | 7.9 | 59.5 | 66.1 |
| | Judgment | — | X | ○ | X | ○ | ○ |
| Strength/Moldability | | — | ○ | X | ○ | ○ | ○ |
| Comprehensive Evaluation | | — | X | X | X | ○ | ○ |

TABLE 1-continued

|  |  | Example | | | | |
|---|---|---|---|---|---|---|
|  |  | A3 | A4 | A5 | A6 | A7 |
| Composite member | Length [mm] | 120 | 120 | 120 | 120 | 120 |
|  | Width [mm] | 200 | 200 | 200 | 200 | 200 |
|  | Average thickness $T_1$ [mm] | 1.0 | 1.0 | 1.0 | 1.0 | 1.0 |
|  | Area S [mm$^2$] | 24000 | 24000 | 24000 | 24000 | 24000 |
|  | Mass [g] | 28.8 | 28.8 | 28.8 | 28.8 | 28.8 |
| Rib portions | Average width t [mm] | 1.0 | 1.0 | 0.4 | 0.5 | 2.0 |
|  | Average height H [mm] | 5.0 | 5.0 | 12.5 | 10.0 | 2.5 |
|  | Ratio H/t | 5.0 | 5.0 | 31.3 | 20.0 | 1.25 |
|  | Total length [mm] | 520.0 | 460.0 | 466.6 | 466.6 | 466.6 |
|  | Area $S_R$ [mm$^2$] | 520.0 | 460.0 | 186.6 | 233.3 | 933.2 |
|  | Mass [g] | 2.5 | 2.2 | 2.2 | 2.2 | 2.2 |
| Ratio $S_R/S$ (×10$^{-2}$) | | 2.17 | 1.92 | 0.78 | 0.97 | 3.89 |
| Ratio $H/T_1$ | | 5.0 | 5.0 | 12.5 | 10.0 | 2.5 |
| Condition (1)/Condition (1') | | ○ | ○ | ○ | ○ | ○ |
| Condition (2)/Condition (2') | | ○ | ○ | ○ | ○ | ○ |
| Condition (3)/Condition (3') | | ○ | ○ | ○ | ○ | ○ |
| Condition (4)/Condition (4') | | ○ | ○ | ○ | ○ | ○ |
| Condition (5)/Condition (5') | | ○ | ○ | ○ | ○ | ○ |
| Evaluation of mass of molded body | Mass [g] | 31.3 | 31.0 | 31.0 | 31.0 | 31.0 |
|  | Increasing rate [%] | 8.6 | 7.6 | 7.7 | 7.7 | 7.7 |
|  | Judgment | ○ | ○ | ○ | ○ | ○ |
| Evaluation of warping | Amount of warping [mm] | 0.60 | 0.71 | 0.44 | 0.45 | 0.83 |
|  | Decreasing rate [%] | 54.8 | 46.5 | 66.4 | 65.7 | 36.9 |
|  | Judgment | ○ | ○ | ○ | ○ | ○ |
| Strength/Moldability | | ○ | ○ | ○ | ○ | ○ |
| Comprehensive Evaluation | | ○ | ○ | ○ | ○ | ○ |

As shown in Table 1, in Examples A1 to A7 satisfying conditions (1) to (5) (conditions (1') to (5')), the mass increasing rate due to formation of the rib portions was suppressed to 20% or less, the decreasing rate of the amount of warping was 30% or more, and an excellent warp suppressing effect was obtained.

On the other hand, the ratio H/t was excessively low in Comparative Example A1 that does not satisfy condition (1) (condition (1')), and a warp suppressing effect was insufficiently obtained in Comparative Example A3 that does not satisfy conditions (2) to (4) (conditions (2') to (4'). In Comparative Example A2 in which the ratio H/t was excessively high and conditions (2) to (4) (conditions (2') to (4') were not satisfied, strength of the rib portions was insufficient since the rib portions were thin and high, and a practical configuration for a molded article was not obtained.

Reference Example A2

Input property values in simulation were set to reproduce the amount of warping (0.66 mm) of the molded body manufactured in the same manner as in Reference Example A1 except that the thickness ($T_1$) was set to 2 mm and the mass was set to 57.6 g in the composite member.

Examples A8 to A13

Simulation was performed in the same manner as in Example A1 except that the dimensions and input property values of the composite member were the same as those of Reference Example A2, and the average width t, the average height H, the ratio H/t, the ratio $S_R/S$, and the mass of the rib portions were changed as shown in Table 2.

Evaluation of warping and evaluation of the mass of the molded body were performed based on Reference Example A2. An evaluation result is shown in Table 2.

Comparative Examples A4 and A5

Simulation was performed in the same manner as in Example A1 except that the dimensions and input property values of the composite member were the same as those of Reference Example A2, and the average width t, the average height H, the ratio H/t, the ratio $S_R/S$, and the mass of the rib portions were changed as shown in Table 2.

Evaluation of warping and evaluation of the mass of the molded body were performed based on Reference Example A2. An evaluation result is shown in Table 2.

TABLE 2

|  |  | Reference Example | Comparative Example | | Example | | | | | |
|---|---|---|---|---|---|---|---|---|---|---|
|  |  | A2 | A4 | A5 | A8 | A9 | A10 | A11 | A12 | A13 |
| Composite member | Length [mm] | 120 | 120 | 120 | 120 | 120 | 120 | 120 | 120 | 120 |
|  | Width [mm] | 200 | 200 | 200 | 200 | 200 | 200 | 200 | 200 | 200 |
|  | Average thickness $T_1$ [mm] | 2.0 | 2.0 | 2.0 | 2.0 | 2.0 | 2.0 | 2.0 | 2.0 | 2.0 |

TABLE 2-continued

|  |  | Reference Example | Comparative Example | | Example | | | | | |
|---|---|---|---|---|---|---|---|---|---|---|
|  |  | A2 | A4 | A5 | A8 | A9 | A10 | A11 | A12 | A13 |
|  | Area S [mm$^2$] | 24000 | 24000 | 24000 | 24000 | 24000 | 24000 | 24000 | 24000 | 24000 |
|  | Mass [g] | 57.6 | 57.6 | 57.6 | 57.6 | 57.6 | 57.6 | 57.6 | 57.6 | 57.6 |
| Rib portions | Average width t [mm] | — | 5.0 | 10.0 | 0.5 | 1.0 | 2.0 | 1.0 | 2.0 | 4.0 |
|  | Average height H [mm] | — | 1.0 | 2.0 | 20.0 | 10.0 | 5.0 | 20.0 | 10.0 | 5.0 |
|  | Ratio H/t | — | 0.2 | 0.2 | 40.0 | 10.0 | 2.5 | 20.0 | 5.0 | 1.3 |
|  | Total length [mm] | — | 466.6 | 466.6 | 466.6 | 466.6 | 466.6 | 466.6 | 466.6 | 466.6 |
|  | Area $S_R$ [mm$^2$] | — | 2332.9 | 4665.8 | 233.3 | 466.6 | 933.2 | 466.6 | 933.2 | 1866.3 |
|  | Mass [g] | — | 4.4 | 8.9 | 4.4 | 4.4 | 4.4 | 8.9 | 8.9 | 8.9 |
|  | Ratio $S_R/S$ (×10$^{-2}$) | — | 9.72 | 19.4 | 0.97 | 1.94 | 3.89 | 1.94 | 3.89 | 7.78 |
|  | Ratio $H/T_1$ | — | 0.5 | 1.0 | 10.0 | 5.0 | 2.5 | 10.0 | 5.0 | 2.5 |
| Condition (1)/Condition (1') |  | X | ○ | ○ | ○ | ○ | ○ | ○ | ○ | ○ |
| Condition (2)/Condition (2') |  | X | X | X | ○ | ○ | ○ | ○ | ○ | ○ |
| Condition (3)/Condition (3') |  | X | X | X | ○ | ○ | ○ | ○ | ○ | ○ |
| Condition (4)/Condition (4') |  | X | X | X | ○ | ○ | ○ | ○ | ○ | ○ |
| Condition (5)/Condition (5') |  | X | ○ | ○ | ○ | ○ | ○ | ○ | ○ | ○ |
| Evaluation of mass of molded body | Mass [g] | 57.6 | 62.0 | 66.5 | 62.0 | 62.0 | 62.0 | 66.5 | 66.5 | 66.5 |
|  | Increasing rate [%] | Reference | 7.7 | 15.4 | 7.7 | 7.7 | 7.7 | 15.4 | 15.4 | 15.4 |
|  | Judgment | — | ○ | ○ | ○ | ○ | ○ | ○ | ○ | ○ |
| Evaluation of warping | Amount of warping [mm] | 0.66 | 0.61 | 0.58 | 0.23 | 0.27 | 0.42 | 0.23 | 0.25 | 0.35 |
|  | Decreasing rate [%] | Reference | 8.0 | 12.7 | 65.6 | 59.2 | 36.8 | 65.9 | 62.4 | 46.3 |
|  | Judgment | — | X | X | ○ | ○ | ○ | ○ | ○ | ○ |
| Strength/Moldability |  | — | ○ | ○ | ○ | ○ | ○ | ○ | ○ | ○ |
| Comprehensive Evaluation |  | — | X | X | ○ | ○ | ○ | ○ | ○ | ○ |

As shown in Table 2, in Examples A8 to A13 satisfying conditions (1) to (5) (conditions (1') to (5')), the mass increasing rate due to formation of the rib portions was suppressed to 20% or less, the decreasing rate of the amount of warping was 30% or more, and an excellent warp suppressing effect was obtained.

A warp suppressing effect was insufficiently obtained in Comparative Examples A4 and A5 in which the ratio H/t is excessively low, and conditions (2) to (4) (conditions (2') to (4')) are not satisfied.

Examples A14 to A20

Simulation was performed in the same manner as in Example A1 except that the average width t, the average height H, the ratio H/t, the ratio $S_R/S$, and the mass of the rib portions were changed as shown in Table 3.

Evaluation of warping and evaluation of the mass of the molded body were performed based on Reference Example A1. An evaluation result is shown in Table 3.

Comparative Examples A6 to A9

Simulation was performed in the same manner as in Example A1 except that the average width t, the average height H, the ratio H/t, the ratio $S_R/S$, and the mass of the rib portions were changed as shown in Table 3.

Evaluation of warping and evaluation of the mass of the molded body were performed based on Reference Example A1. An evaluation result is shown in Table 3.

TABLE 3

|  |  | Reference Example | Comparative Example | | | | Example |
|---|---|---|---|---|---|---|---|
|  |  | A1 | A6 | A7 | A8 | A9 | A14 |
| Composite member | Length [mm] | 120 | 120 | 120 | 120 | 120 | 120 |
|  | Width [mm] | 200 | 200 | 200 | 200 | 200 | 200 |
|  | Average thickness $T_1$ [mm] | 1.0 | 1.0 | 1.0 | 1.0 | 1.0 | 1.0 |
|  | Area S [mm$^2$] | 24000 | 24000 | 24000 | 24000 | 24000 | 24000 |
|  | Mass [g] | 28.8 | 28.8 | 28.8 | 28.8 | 28.8 | 28.8 |
| Rib portions | Average width t [mm] | — | 0.1 | 5.0 | 1.0 | 1.0 | 0.3 |
|  | Average height H [mm] | — | 5.0 | 5.0 | 2.0 | 15.0 | 5.0 |
|  | Ratio H/t | — | 50.0 | 1.0 | 2.0 | 15.0 | 16.7 |
|  | Total length [mm] | — | 466.6 | 466.6 | 466.6 | 466.6 | 466.6 |
|  | Area $S_R$ [mm$^2$] | — | 46.7 | 2332.9 | 466.6 | 466.6 | 140.0 |
|  | Mass [g] | — | 0.2 | 11.1 | 0.9 | 6.6 | 0.7 |
|  | Ratio $S_R/S$ (×10$^{-2}$) | — | 0.19 | 9.72 | 1.94 | 1.94 | 0.58 |
|  | Ratio $H/T_1$ | — | 5.0 | 5.0 | 2.0 | 15.0 | 5.0 |
| Condition (1)/Condition (1') |  | X | ○ | ○ | ○ | ○ | ○ |
| Condition (2)/Condition (2') |  | X | ○ | ○ | ○ | ○ | ○ |
| Condition (3)/Condition (3') |  | X | X | X | ○ | ○ | ○ |

TABLE 3-continued

|  |  |  |  |  |  |  |  |
|---|---|---|---|---|---|---|---|
| Condition (4)/Condition (4') |  | X | ○ | ○ | X | X | ○ |
| Condition (5)/Condition (5') |  | X | ○ | ○ | ○ | ○ | ○ |
| Evaluation of mass of molded body | Mass [g] | 28.8 | 29.0 | 39.9 | 29.7 | 35.4 | 29.5 |
|  | Increasing rate [%] | Reference | 0.8 | 38.5 | 3.1 | 23.1 | 2.3 |
|  | Judgment | — | ○ | X | ○ | X | ○ |
| Evaluation of warping | Amount of warping [mm] | 1.32 | 0.98 | 0.37 | 1.11 | 0.43 | 0.72 |
|  | Decreasing rate [%] | Reference | 25.7 | 72.2 | 16.1 | 67.7 | 45.2 |
|  | Judgment | — | X | ○ | X | ○ | ○ |
| Strength/Moldability |  | — | X | ○ | ○ | ○ | ○ |
| Comprehensive Evaluation |  | — | X | X | X | X | ○ |

|  |  | Example | | | | | |
|---|---|---|---|---|---|---|---|
|  |  | A15 | A16 | A17 | A18 | A19 | A20 |
| Composite member | Length [mm] | 120 | 120 | 120 | 120 | 120 | 120 |
|  | Width [mm] | 200 | 200 | 200 | 200 | 200 | 200 |
|  | Average thickness $T_1$ [mm] | 1.0 | 1.0 | 1.0 | 1.0 | 1.0 | 1.0 |
|  | Area S [mm²] | 24000 | 24000 | 24000 | 24000 | 24000 | 24000 |
|  | Mass [g] | 28.8 | 28.8 | 28.8 | 28.8 | 28.8 | 28.8 |
| Rib portions | Average width t [mm] | 0.5 | 2.5 | 1.0 | 1.0 | 1.0 | 1.0 |
|  | Average height H [mm] | 5.0 | 5.0 | 3.0 | 8.0 | 10.0 | 13.0 |
|  | Ratio H/t | 10.0 | 2.0 | 16.7 | 8.0 | 10.0 | 13.0 |
|  | Total length [mm] | 466.6 | 466.6 | 466.6 | 466.6 | 466.6 | 466.6 |
|  | Area $S_R$ [mm²] | 233.3 | 1166.5 | 466.6 | 466.6 | 466.6 | 466.6 |
|  | Mass [g] | 1.1 | 5.5 | 1.3 | 3.5 | 4.4 | 5.8 |
| Ratio $S_R/S$ (×10⁻²) |  | 0.97 | 4.86 | 1.94 | 1.94 | 1.94 | 1.94 |
| Ratio $H/T_1$ |  | 5.0 | 5.0 | 3.0 | 8.0 | 10.0 | 13.0 |
| Condition (1)/Condition (1') |  | ○ | ○ | ○ | ○ | ○ | ○ |
| Condition (2)/Condition (2') |  | ○ | ○ | ○ | ○ | ○ | ○ |
| Condition (3)/Condition (3') |  | ○ | ○ | ○ | ○ | ○ | ○ |
| Condition (4)/Condition (4') |  | ○ | ○ | ○ | ○ | ○ | ○ |
| Condition (5)/Condition (5') |  | ○ | ○ | ○ | ○ | ○ | ○ |
| Evaluation of mass of molded body | Mass [g] | 29.9 | 34.3 | 30.1 | 32.3 | 33.2 | 34.6 |
|  | Increasing rate [%] | 3.8 | 19.2 | 4.6 | 12.3 | 15.4 | 20.0 |
|  | Judgment | ○ | ○ | ○ | ○ | ○ | ○ |
| Evaluation of warping | Amount of warping [mm] | 0.62 | 0.46 | 0.84 | 0.46 | 0.45 | 0.43 |
|  | Decreasing rate [%] | 53.0 | 65.0 | 36.2 | 65.3 | 66.3 | 67.2 |
|  | Judgment | ○ | ○ | ○ | ○ | ○ | ○ |
| Strength/Moldability |  | ○ | ○ | ○ | ○ | ○ | ○ |
| Comprehensive Evaluation |  | ○ | ○ | ○ | ○ | ○ | ○ |

As shown in Table 3, in Examples A14 to A20 satisfying conditions (1) to (5) (conditions (1') to (5')), the mass increasing rate due to formation of the rib portions was suppressed to 20% or less, the decreasing rate of the amount of warping was 30% or more, and an excellent warp suppressing effect was obtained.

A warp suppressing effect was insufficiently obtained in Comparative Example A6 in which the ratio $S_R/S$ is excessively small and thus condition (3) (condition (3')) is not satisfied and Comparative Example A8 in which the ratio $H/T_1$ is excessively small and thus condition (4) (condition (4')) is not satisfied. In Comparative Example A7 in which the ratio $S_R/S$ is excessively large and thus condition (3) (condition (3')) is not satisfied and Comparative Example A7 in which the ratio $H/T_1$ is excessively large and thus condition (4) (condition (4)) is not satisfied, even though a sufficient warp suppressing effect was obtained, the mass increasing rate of the molded body was large, and thus raw material cost was high and the comparative examples were impractical.

Example A21

As illustrated in FIG. 5, simulation was performed in the same manner as in Example A1 on the molded body 15 obtained by removing a part in which the first rib portion 112a and the second rib portion 112b of the molded body 11 intersect each other. Each of lengths of four split rib portions was set to 87 mm, and a ratio of a total length of the rib portions in the molded body 15 to the total length of the rib portions in the molded body 11 was set to 75%. A ratio Q of a length of each of the four split rib portions to a circumferential length (640 mm) of an outer edge of the composite member 110 was set to 13.7%.

Evaluation of warping and evaluation of the mass of the molded body were performed based on Reference Example A1. An evaluation result is shown in Table 4.

Example A22

Simulation was performed in the same manner as in Example A1 on the molded body 16 obtained by partially removing the portions around the intersection point of the first rib portion 112a and the second rib portion 112b and portions of 14.6 mm from the both ends thereof in the molded body 11 as illustrated in FIG. 6. In the molded body 16, at a central portion of the composite member 110, the rib portions having a length of 29.2 mm intersect each other at centers thereof. In addition, each of lengths of four radial rib portions from the intersecting rib portions at the central portion to four corners of the composite member was set to 72.9 mm. A ratio of a total length of the rib portions in the molded body 16 to the total length of the rib portions in the molded body 11 was set to 75%. A ratio Q of a length of a longest rib portion to a circumferential length (640 mm) of an outer edge of the composite member 110 was set to 11.4%.

Evaluation of warping and evaluation of the mass of the molded body were performed based on Reference Example A1. An evaluation result is shown in Table 4.

Comparative Example A10

Figure 17:
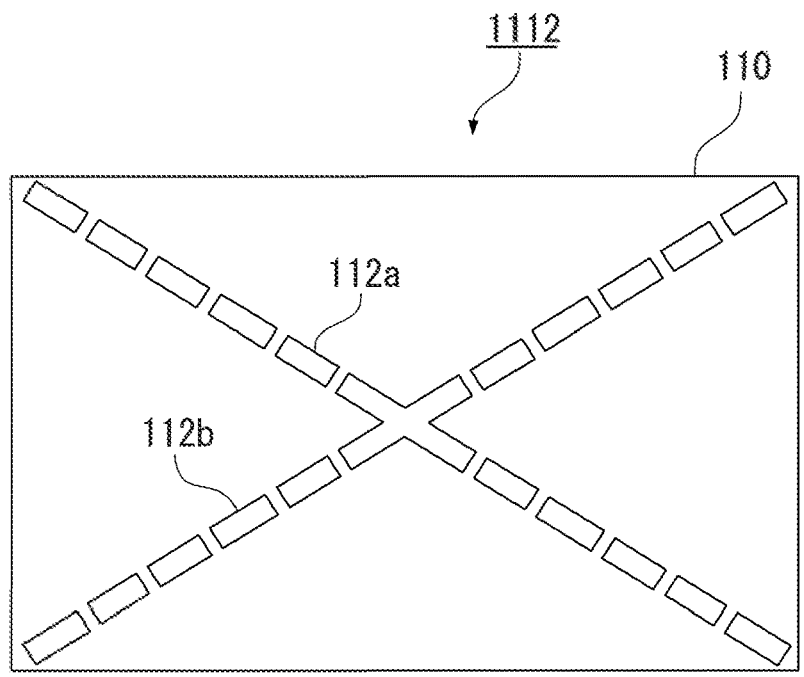
FIG. 17 is a plan view illustrating a molded body simulated in Comparative Example A10.

Simulation was performed in the same manner as in Example A1 on a molded body 1112 obtained by partially removing the first rib portion 112a and the second rib portion 112b of the molded body 11 such that the first rib portion 112a and the second rib portion 112b have a broken line shape as illustrated in FIG. 17. In the molded body 1112, at a central portion of a composite member 110, rib portions having a length of 29.2 mm intersect each other at centers thereof. In addition, radial and intermittent rib portions that extend from the rib portions intersecting at the central portion to four corners of the composite member 110 were set to have a length of 14.6 mm and an interval of 4.9 mm. A distance between a corner of the composite member 110 and a rib portion closest to the corner was set to 4.9 mm. A ratio of a total length of the rib portions in the molded body 1112 to the total length of the rib portions in the molded body 11 was set to 75%. A ratio Q of a length of a longest rib portion to a circumferential length (640 mm) of an outer edge of the composite member 110 was set to 4.6%.

Evaluation of warping and evaluation of the mass of the molded body were performed based on Reference Example A1. An evaluation result is shown in Table 4.

Comparative Example A11

Figure 18:
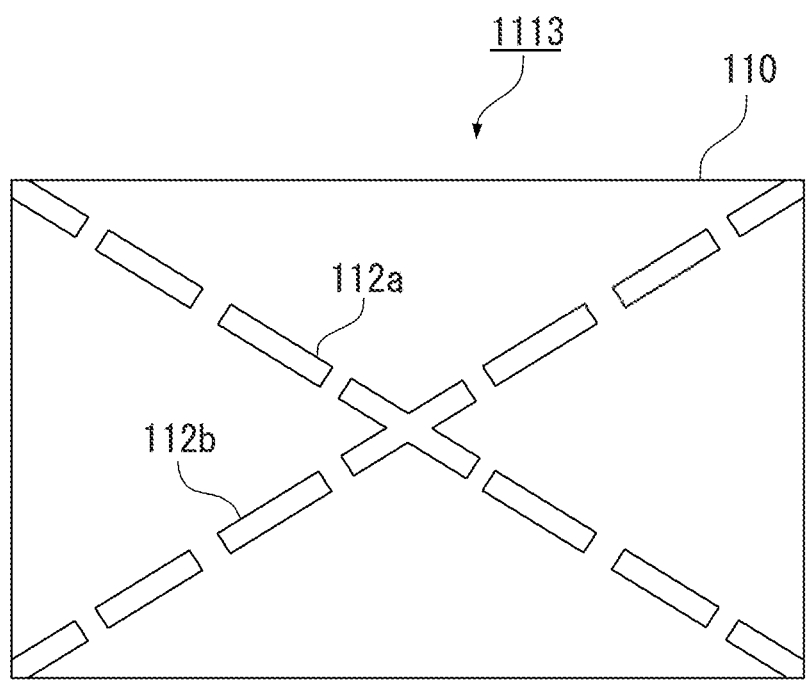
FIG. 18 is a plan view illustrating a molded body simulated in Comparative Example A11.

Simulation was performed in the same manner as in Example A1 on a molded body 1113 obtained by partially removing the first rib portion 112a and the second rib portion 112b of the molded body 11 such that the first rib portion 112a and the second rib portion 112b have a broken line shape as illustrated in FIG. 18. In the molded body 1113, at a central portion of a composite member 110, rib portions having a length of 38.9 mm intersect each other at centers thereof. In addition, two radial and intermittent rib portions that extend from the rib portions intersecting at the central portion to four corners of the composite member 110 were set to have a length of 24.3 mm and an interval of 9.7 mm. Further, an interval of 9.7 mm was formed, and a rib portion having a length of 19.4 from a corner of the composite member 110 was left at the corner side. A ratio of a total length of the rib portions in the molded body 1113 to the total length of the rib portions in the molded body 11 was set to 75%. A ratio Q of a length of a longest rib portion to a circumferential length (640 mm) of an outer edge of the composite member 110 was set to 6.1%.

Evaluation of warping and evaluation of the mass of the molded body were performed based on Reference Example A1. An evaluation result is shown in Table 4.

TABLE 4

|  |  | Reference Example | Comparative Example | | Example | |
| --- | --- | --- | --- | --- | --- | --- |
|  |  | A1 | A10 | A11 | A21 | A22 |
| Composite member | Length [mm] | 120 | 120 | 120 | 120 | 120 |
|  | Width [mm] | 200 | 200 | 200 | 200 | 200 |
|  | Average thickness $T_1$ [mm] | 1.0 | 1.0 | 1.0 | 1.0 | 1.0 |
|  | Area S [mm$^2$] | 24000 | 24000 | 24000 | 24000 | 24000 |
|  | Mass [g] | 28.8 | 28.8 | 28.8 | 28.8 | 28.8 |
| Rib portions | Average width t [mm] | — | 1.0 | 1.0 | 1.0 | 1.0 |
|  | Average height H [mm] | — | 5.0 | 5.0 | 5.0 | 5.0 |
|  | Ratio H/t | — | 5.0 | 5.0 | 5.0 | 5.0 |
|  | Total length [mm] | — | 349.9 | 349.9 | 349.9 | 349.9 |
|  | Area $S_R$ [mm$^2$] | — | 349.9 | 349.9 | 349.9 | 349.9 |
|  | Mass [g] | — | 1.7 | 1.7 | 1.7 | 1.7 |
| Ratio $S_R$/S (×10$^{-2}$) | | — | 1.46 | 1.46 | 1.46 | 1.46 |
| Ratio H/$T_1$ | | — | 5.0 | 5.0 | 5.0 | 5.0 |
| Condition (1)/Condition (1') | | X | ○ | ○ | ○ | ○ |
| Condition (2)/Condition (2') | | X | ○ | ○ | ○ | ○ |
| Condition (3)/Condition (3') | | X | ○ | ○ | ○ | ○ |
| Condition (4)/Condition (4') | | X | ○ | ○ | ○ | ○ |
| Condition (5)/Condition (5') | | X | X | X | ○ | ○ |
| Evaluation of mass of molded body | Mass [g] | 28.8 | 30.5 | 30.5 | 30.5 | 30.5 |
|  | Increasing rate [%] | Reference | 5.8 | 5.8 | 5.8 | 5.8 |
|  | Judgment | — | ○ | ○ | ○ | ○ |
| Evaluation of warping | Amount of warping [mm] | 1.32 | 1.11 | 0.99 | 0.82 | 0.80 |
|  | Decreasing rate [%] | Reference | 15.7 | 25.4 | 37.6 | 39.6 |
|  | Judgment | — | X | X | ○ | ○ |
| Strength/Moldability | | — | ○ | ○ | ○ | ○ |
| Comprehensive Evaluation | | — | X | X | ○ | ○ |

As shown in Table 4, in Examples A21 and A22 satisfying conditions (1) to (5) (conditions (1') to (5')), the mass increasing rate due to formation of the rib portions was suppressed to 20% or less, the decreasing rate of the amount of warping was 30% or more, and an excellent warp suppressing effect was obtained.

In Comparative Examples A10 and A11 in which the rib portions are short and condition (5) (condition (5')) is not satisfied, a warp suppressing effect was insufficient.

Reference Example A3

Input property values in simulation were set to reproduce the amount of warping (1.10 mm) of a molded body (238.3 g) manufactured in the same manner as in Reference Example 1 except that the molded body has a box shape in which a second plate-shaped portion having a height of 15 umm is provided in an outer edge portion of a first plate-shaped portion having a length 280 mm×width 400 mm×thickness 1.5 mm.

Example A23

Simulation was performed on the molded body 22 in which the first rib portion 212c and the second rib portion 212d corresponding to two rib portions are formed on the diagonal lines of the box-shaped composite member 210 as illustrated in FIG. 8. The dimensions and input property values of the composite member 210 were the same as those in Reference Example A3. The cross-sectional shapes of the first rib portion 212c and the second rib portion 212d were set to rectangular shapes, an average width t was set to 1 mm, an average height H was set to 15 mm, and a ratio H/t was set to 15.0. In addition, a ratio $S_R/S$ was set to 0.87× $10^{-2}$, and a ratio $H/T_I$ was set to 10.0. The mass of the composite member 210 was set to 238.3 g, the total mass of the first rib portion 212c and the second rib portion 212d was set to 13.9 g, and the total mass of the molded body 11 was set to 252.2 g.

Examples A24 to A32

Simulation was performed in the same manner as in Example A23 except that the average width t, the average height H, the ratio H/t, the ratio $S_R/S$, and the mass of the rib portions were changed as shown in Table 5.

Evaluation of warping and evaluation of the mass of the molded body were performed based on Reference Example A3. An evaluation result is shown in Table 5.

TABLE 5

|  |  | Reference Example | Example | | | | |
|---|---|---|---|---|---|---|---|
|  |  | A3 | A23 | A24 | A25 | A26 | A27 |
| Composite member | Length [mm] | 280 | 280 | 280 | 280 | 280 | 280 |
|  | Width [mm] | 400 | 400 | 400 | 400 | 400 | 400 |
|  | Average thickness $T_1$ [mm] | 1.5 | 1.5 | 1.5 | 1.5 | 1.5 | 1.5 |
|  | Area S [mm²] | 112000 | 112000 | 112000 | 112000 | 112000 | 112000 |
|  | Mass [g] | 238.3 | 238.3 | 238.3 | 238.3 | 238.3 | 238.3 |
| Rib portions | Average width t [mm] | — | 1.0 | 1.5 | 2.0 | 3.0 | 1.0 |
|  | Average height H [mm] | — | 15.0 | 10.0 | 7.5 | 5.0 | 10.0 |
|  | Ratio H/t | — | 15.0 | 6.7 | 3.8 | 1.67 | 10.0 |
|  | Total length [mm] | — | 976.5 | 976.5 | 976.5 | 976.5 | 976.5 |
|  | Area $S_R$ [mm²] | — | 976.5 | 1464.8 | 1953 | 2929.6 | 976.5 |
|  | Mass [g] | — | 13.9 | 13.9 | 13.9 | 13.9 | 9.3 |
| Ratio $S_R/S$ (×10⁻²) |  | — | 0.87 | 1.31 | 1.74 | 2.62 | 0.87 |
| Ratio $H/T_1$ |  | — | 10.0 | 6.7 | 5.0 | 3.3 | 6.7 |
| Condition (1)/Condition (1') |  | X | ○ | ○ | ○ | ○ | ○ |
| Condition (2)/Condition (2') |  | X | ○ | ○ | ○ | ○ | ○ |
| Condition (3)/Condition (3') |  | X | ○ | ○ | ○ | ○ | ○ |
| Condition (4)/Condition (4') |  | X | ○ | ○ | ○ | ○ | ○ |
| Condition (5)/Condition (5') |  | X | ○ | ○ | ○ | ○ | ○ |
| Evaluation of mass of molded body | Mass [g] | 238.3 | 252.2 | 252.2 | 252.2 | 252.2 | 247.6 |
|  | Increasing rate [%] | Reference | 5.8 | 5.8 | 5.8 | 5.8 | 3.9 |
|  | Judgment | — | ○ | ○ | ○ | ○ | ○ |
| Evaluation of warping | Amount of warping [mm] | 1.10 | 0.14 | 0.18 | 0.28 | 0.47 | 0.23 |
|  | Decreasing rate [%] | Reference | 87.3 | 83.6 | 74.9 | 57.0 | 79.3 |
|  | Judgment | — | ○ | ○ | ○ | ○ | ○ |
| Strength/Moldability |  | — | ○ | ○ | ○ | ○ | ○ |
| Comprehensive Evaluation |  | — | ○ | ○ | ○ | ○ | ○ |

|  |  | Example | | | | |
|---|---|---|---|---|---|---|
|  |  | A28 | A29 | A30 | A31 | A32 |
| Composite member | Length [mm] | 280 | 280 | 280 | 280 | 280 |
|  | Width [mm] | 400 | 400 | 400 | 400 | 400 |
|  | Average thickness $T_1$ [mm] | 1.5 | 1.5 | 1.5 | 1.5 | 1.5 |

TABLE 5-continued

|  |  |  |  |  |  |  |
|---|---|---|---|---|---|---|
|  | Area S [mm$^2$] | 112000 | 112000 | 112000 | 112000 | 112000 |
|  | Mass [g] | 238.3 | 238.3 | 238.3 | 238.3 | 238.3 |
| Rib portions | Average width t [mm] | 2.5 | 5.0 | 1.5 | 1.5 | 1.5 |
|  | Average height H [mm] | 10.0 | 10.0 | 5.0 | 7.5 | 15.0 |
|  | Ratio H/t | 4.0 | 2.0 | 3.3 | 5.0 | 10.0 |
|  | Total length [mm] | 976.5 | 976.5 | 976.5 | 976.5 | 976.5 |
|  | Area $S_R$ [mm$^2$] | 2441.3 | 4882.6 | 1464.8 | 1464.8 | 1464.8 |
|  | Mass [g] | 23.2 | 46.4 | 7.0 | 10.5 | 20.9 |
| Ratio $S_R/S$ (×10$^{-2}$) |  | 2.18 | 4.36 | 1.31 | 1.31 | 1.31 |
| Ratio $H/T_1$ |  | 6.7 | 6.7 | 3.3 | 5.0 | 10.0 |
| Condition (1)/Condition (1') |  | ○ | ○ | ○ | ○ | ○ |
| Condition (2)/Condition (2') |  | ○ | ○ | ○ | ○ | ○ |
| Condition (3)/Condition (3') |  | ○ | ○ | ○ | ○ | ○ |
| Condition (4)/Condition (4') |  | ○ | ○ | ○ | ○ | ○ |
| Condition (5)/Condition (5') |  | ○ | ○ | ○ | ○ | ○ |
| Evaluation of mass of molded body | Mass [g] | 261.5 | 284.7 | 245.3 | 248.8 | 259.2 |
|  | Increasing rate [%] | 9.7 | 19.5 | 2.9 | 4.4 | 8.8 |
|  | Judgment | ○ | ○ | ○ | ○ | ○ |
| Evaluation of warping | Amount of warping [mm] | 0.15 | 0.15 | 0.63 | 0.32 | 0.16 |
|  | Decreasing rate [%] | 86.5 | 86.5 | 42.2 | 70.5 | 85.6 |
|  | Judgment | ○ | ○ | ○ | ○ | ○ |
| Strength/Moldability |  | ○ | ○ | ○ | ○ | ○ |
| Comprehensive Evaluation |  | ○ | ○ | ○ | ○ | ○ |

As shown in Table 5, with regard to the box-shaped molded body, in Examples A23 to A32 satisfying conditions (1) to (5) (conditions (1') to (5')), the mass increasing rate due to formation of the rib portions was suppressed to 20% or less, the decreasing rate of the amount of warping was 30%/0 or more, and an excellent warp suppressing effect was obtained.

Manufacturing Example B1: Manufacture of Fiber Reinforced Composite Material

Carbon fibers (product name "Pyrophyl carbon fiber tow TR 50S", manufactured by Mitsubishi Rayon Co., Ltd.) are aligned in one direction and a planar shape to form a fiber sheet having a basis weight of 78 g/m$^2$. The fiber sheet is interposed from both surfaces by a film having a basis weight of 36 g/m$^2$ which uses an acid-modified polypropylene resin (product name "MODIC P958V", manufactured by Mitsubishi Chemical Co., Ltd., a softening temperature: 165° C.) as the matrix rein (A). The fiber sheet interposed by the film is heated and pressed by passing through a calender roll several times, and the resin is impregnated into the fiber sheet, thereby manufacturing a prepreg having a fiber volume fraction (Vf) of 35% by volume and a thickness of 120 μm. Subsequently, a notch having a depth for cutting the carbon fiber is cut from the prepreg using a cutting plotter (made by Rezac L-2500 cutting plotter) such that an absolute value of an angle between the carbon fiber and a fiber axis is 45° and a fiber length of the carbon fiber is 25 mm, thereby obtaining a notched prepreg.

Subsequently, eight obtained notched prepregs are stacked such that a fiber axis direction of the carbon fiber is 0°/45°/90°/135°/135°/90°/45°/0° in a planar view, heated up to 200° C., heated/pressed at a pressure of 0.2 MPa for two minutes on a board surface of 200° C. using a multi-stage press machine (a compression molding machine manufactured by Kondo Metal Industrial Co., Ltd., product name: SFA-50HH0), and then cooled up to room temperature at the same pressure, thereby obtaining a fiber reinforced composite material plate having a thickness of 1 mm.

Subsequently, a fiber reinforced composite material made of the obtained 1 mm fiber reinforced composite material plate or a prepreg stacked body having a 200 mm×120 mm rectangular planar shape is obtained.

Example B1

The molded body 21 illustrated in FIG. 7 is manufactured using the mold 2100 illustrated in FIG. 13.

As illustrated in FIG. 13, the fiber reinforced composite material (fiber reinforced composite material 230) obtained in Example B1 is disposed on the convex portion 2110 of the lower mold 2112. Subsequently, as illustrated in FIG. 14, after the fiber reinforced composite material is heated to 210° C. using the infrared heater, the upper mold 2116 is lowered to close the mold 2100, and the fiber reinforced composite material is shaped to form the box-shaped composite member 210. Subsequently, as illustrated in FIG. 15, "Novatec SA06GA" (product name, manufactured by Nippon Polypro Co., Ltd.) corresponding to a polypropylene resin used as the thermoplastic resin (B) 232 is injected in the molten state from the resin flow path 2120 to fill the groove portion 2118, and the first rib portion 212a and the second rib portion 212b are molded to obtain the molded body 21. A temperature of the mold 2100 at the time of mold clamping is set to 80° C. The mold 2100 is opened after one minute from injection and filling of the thermoplastic resin (B), and the molded body 21 is taken out.

Comparative Example B1

A molded body is manufactured in the same manner as in Example B except that the rib portions are not formed using the same mold as the mold 21X) except that the groove portion 2118 and the resin flow path 2120 are not provided.

[Evaluation of Warping]

In each example, the molded body demolded from the mold is visually inspected and evaluated according to the following criterion.

○ (Good): Warping in the molded body is sufficiently suppressed.

x (Bad): Obvious warping is found in the molded body.

Evaluation results of Example B1 and Comparative Example B1 are shown in Table 6.

TABLE 6

|  | Example B1 | Comparative Example B1 |
|---|---|---|
| Evaluation of warping | ○ | X |

EXPLANATIONS OF LETTERS OR NUMERALS 11 to 16, 21 to 26: molded body
110, 210: composite member
111, 211: first surface
112a, 212a, 212c: first rib portion
112b, 212b, 212d: second rib portion
112c: third rib portion
112d: fourth rib portion
212e to 212j: rib portion
214: first plate-shaped portion
216, 216A: second plate-shaped portion
217, 217A: bent portion
218: plate-shaped portion
220: curved portion
230: fiber reinforced composite material
232: thermoplastic resin (B)

The invention claimed is:

1. A molded body comprising:
a plate-shaped composite member comprising a fiber reinforced composite material comprising a reinforcing fiber (f1) and a matrix resin (A); and
a plurality of rib portions corresponding to two or more convex stripes which are directly formed on top of a surface of the composite member and comprise a thermoplastic resin (B), wherein at least one of the plurality of rib portions is formed along an inner surface of a bent portion of the composite member or an inner concave surface of a curved portion of the composite member such that a bottom part of the at least one rib portion at an interface between the at least one rib portion and the surface of the composite member continuously contours the composite member from a first end portion of the surface of the composite member through the bent portion or the curved portion and to a second end portion of the surface of the composite member,
wherein the molded body satisfies the following conditions (1') to (5'):
(1') an arbitrary rib portion or an extended line of a long axis thereof intersects with another rib portion or an extended line of a long axis thereof on the surface of the composite member;
(2') a ratio H/t of an average height H to an average width t of the rib portions is 1 or more and 50 or less;
(3') a ratio $S_R/S$ of an area $S_R$ occupied by the rib portions on a surface of the composite member on a side at which the rib portions are formed to an area S of the surface is $5.0 \times 10^{-3}$ or more and less than $8.0 \times 10^{-2}$;
(4') a ratio $H/T_I$ of the average height H of the rib portions to an average thickness $T_I$ of the composite member is 2.5 or more and 13 or less; and
(5') a ratio Q of a length of at least one rib portion to a circumferential length of an outer edge of the composite member is 8% or more, and
wherein an intersection point of two rib portions of the plurality of rib portions is formed only on an upward facing part of the top of the surface of the composite member.

2. The molded body according to claim 1, wherein a number average fiber length of the reinforcing fiber (f1) is in a range of 1 to 100 mm.

3. The molded body according to claim 1, wherein the composite member is bent or curved.

4. The molded body according to claim 1, wherein the rib portions are formed using only the thermoplastic resin (B).

5. The molded body according to claim 1, wherein the rib portions are formed using the thermoplastic resin (B) and a reinforcing fiber (f2) having a number average fiber length less than 1 mm.

6. The molded body according to claim 5, wherein a fiber mass fraction of the reinforcing fiber (f2) in the rib portions is 40% by mass or less.

7. The molded body according to claim 1, wherein the reinforcing fiber (f1) having a number average fiber length of 1 to 100 mm is contained in root side portions of the rib portions that are directly adjacent to distal end portions of the rib portions, and the distal end portions of the rib portions are formed using only the thermoplastic resin (B).

8. The molded body according to claim 1, wherein the reinforcing fiber (f1) having a number average fiber length of 1 to 100 mm is contained in root side portions of the rib portions that are directly adjacent to distal end portions of the rib portions, and the distal end portions of the rib portions are formed using the thermoplastic resin (B) and a reinforcing fiber (f2) having a number average fiber length less than 1 mm.

9. The molded body according to claim 8, wherein a fiber mass fraction of the reinforcing fiber (f2) in the distal end portions of the rib portions is 30% by mass or less.

10. The molded body according to claim 1, wherein the rib portions are made of a rectangular plate piece.

11. The molded body according to claim 1, wherein the composite material includes a first plate-shaped portion having a rectangular planar shape and a second plate-shaped portion having a rectangular planar shape that vertically rises from one edge portion of the first plate-shaped portion such that the composite material has a bent portion at a connection part between the first plate-shaped portion and the second plate-shaped portion.

12. The molded body according to claim 1, wherein the at least one rib portion has a curved shape along the inner concave surface of the curved portion of the composite member.

* * * * *